(12) United States Patent
Nonaka

(10) Patent No.: US 7,356,255 B2
(45) Date of Patent: Apr. 8, 2008

(54) ELECTRONIC CAMERA, INFORMATION DEVICE AND PORTABLE INFORMATION APPARATUS

(75) Inventor: Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/655,641

(22) Filed: Jan. 19, 2007

(65) Prior Publication Data

US 2007/0116455 A1     May 24, 2007

Related U.S. Application Data

(62) Division of application No. 10/719,253, filed on Nov. 21, 2003.

(30) Foreign Application Priority Data

Nov. 25, 2002  (JP) .............. 2002-341005
Jan. 7, 2003    (JP) .............. 2003-001462

(51) Int. Cl.
  *G03B 17/18*  (2006.01)
  *G03B 17/24*  (2006.01)
  *H04N 5/76*   (2006.01)
  *H04N 5/232*  (2006.01)

(52) U.S. Cl. .................. 396/287; 396/310; 348/231.1; 348/333.02

(58) Field of Classification Search ............... 396/287, 396/310
See application file for complete search history.

(56) References Cited

U.S. PATENT DOCUMENTS

3,805,238 A * 4/1974 Rothfjell .................. 382/118
5,715,487 A * 2/1998 McIntyre et al. ........... 396/299
5,978,016 A * 11/1999 Lourette et al. ............ 348/64

FOREIGN PATENT DOCUMENTS

| JP | 06-314176    | 11/1994 |
| JP | 09-163285    | 6/1997  |
| JP | 10-191254    | 7/1998  |
| JP | 2000-013720  | 1/2000  |
| JP | 2001-036782  | 2/2001  |
| JP | 2002-112095  | 4/2002  |

OTHER PUBLICATIONS

Notification of Reasons for Rejection to Japanese Patent Application No. 2002-341005, Mailed Jul. 10, 2007 (4 pgs.) with translation (4 pgs.).

* cited by examiner

*Primary Examiner*—W. B. Perkey
(74) *Attorney, Agent, or Firm*—Straub and Pokotylo; John C. Pokotylo

(57) ABSTRACT

An electronic camera comprising an LCD panel for image reproduction and an imaging device is disclosed, in which private information attaching a predetermined attribute to a designated photographed image can be input, and in accordance with the private information, the image reproduction on the LCD panel is prohibited by a command from a CPU.

6 Claims, 17 Drawing Sheets

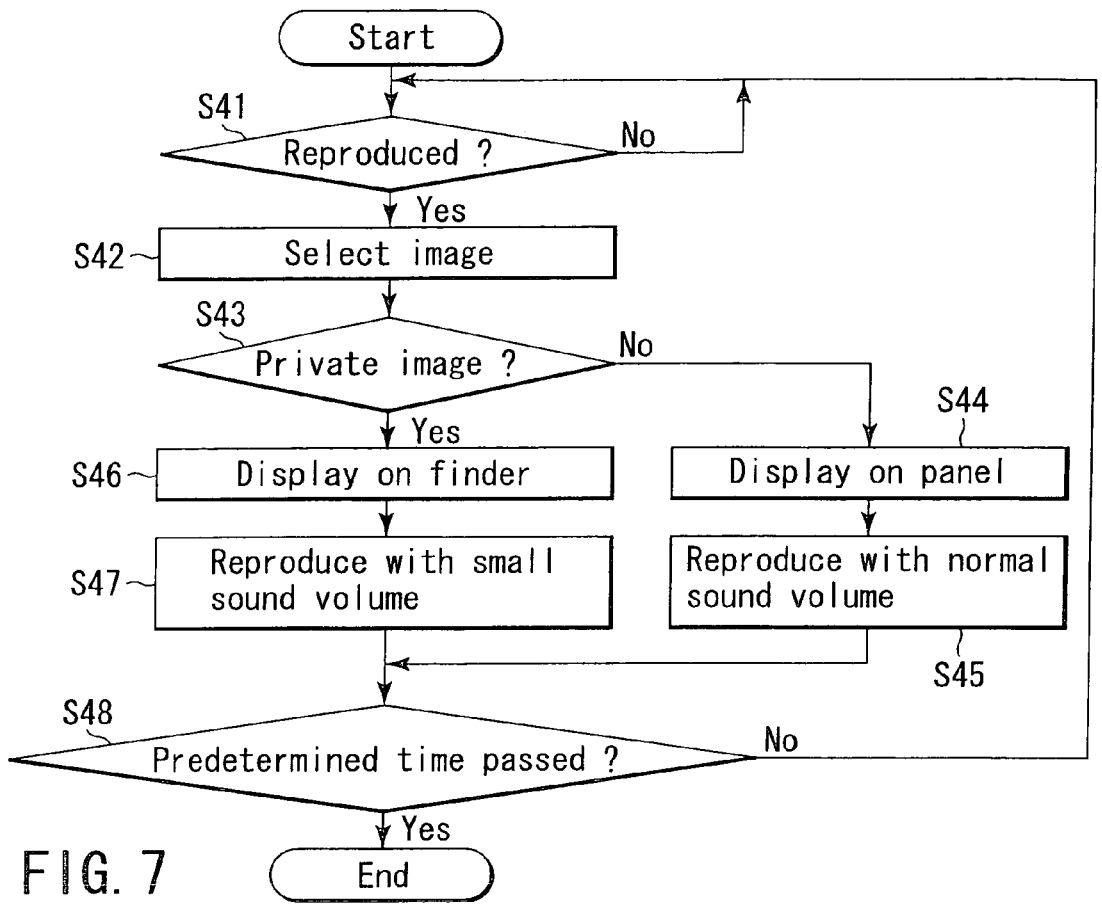
FIG. 7
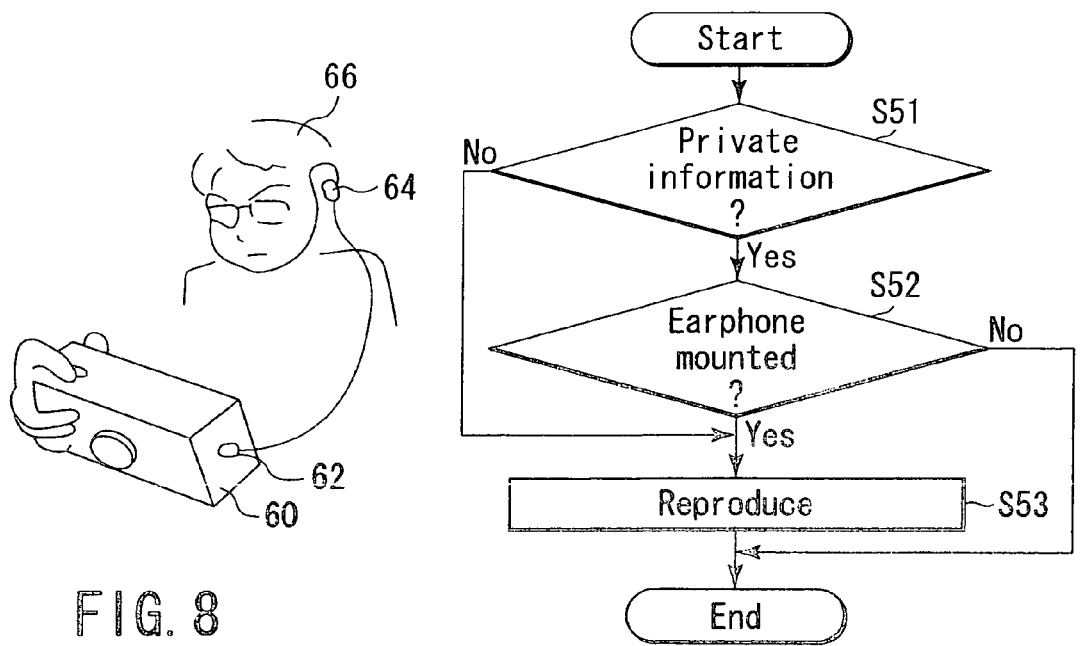
FIG. 8
FIG. 9

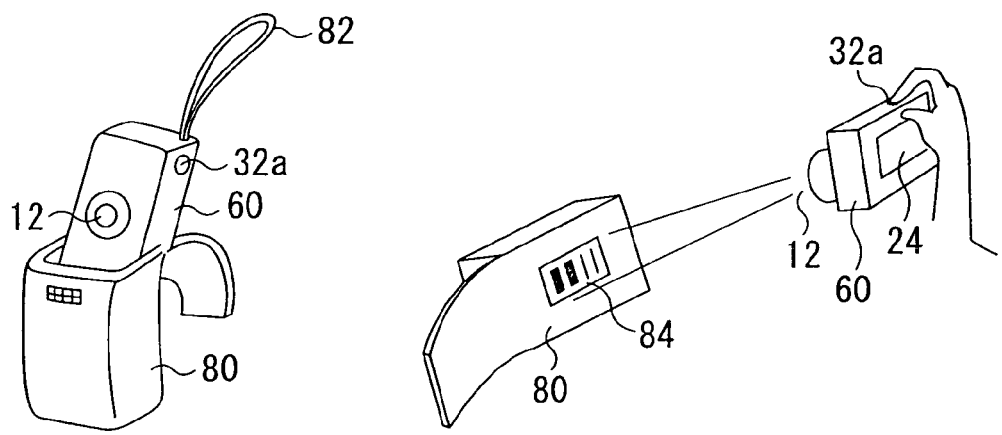
FIG. 21A
FIG. 21B
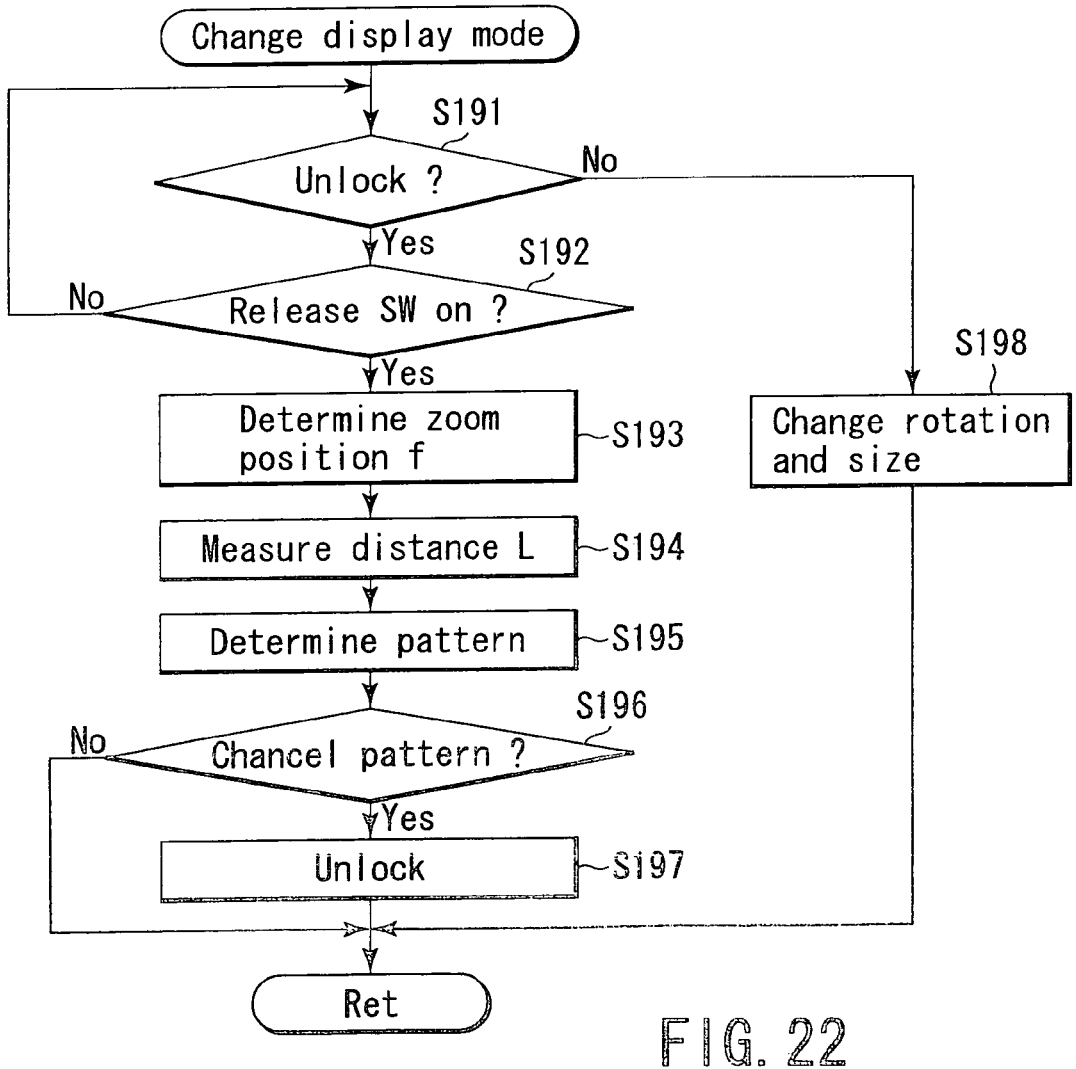
FIG. 22

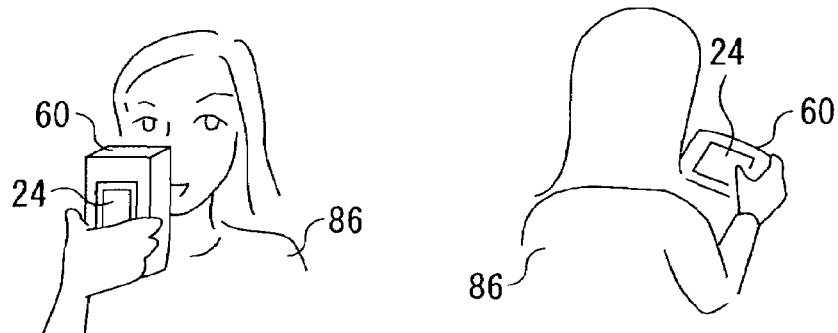
FIG. 26A
FIG. 26B
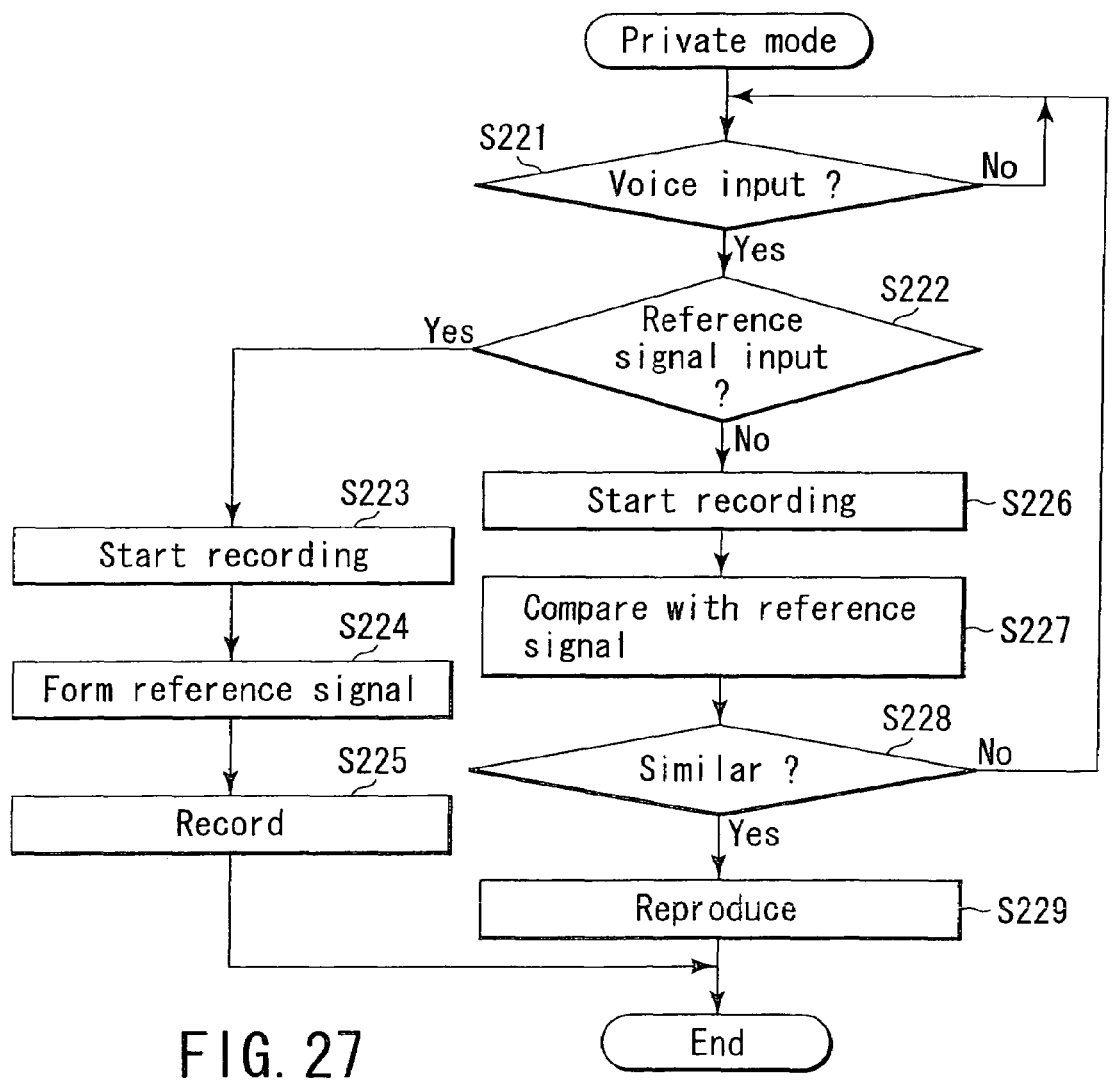
FIG. 27

ELECTRONIC CAMERA, INFORMATION DEVICE AND PORTABLE INFORMATION APPARATUS

CROSS-REFERENCE TO RELATED APPLICATIONS

This application is a divisional application of U.S. patent application Ser. No. 10/719,253 (titled "ELECTRONIC CAMERA, INFORMATION DEVICE AND PORTABLE INFORMATION APPARATUS," filed on Nov. 21, 2003, listing Osamu Nonaka as the inventor), which claims the benefit of priority from the prior Japanese Patent Applications No. 2002-341005, filed Nov. 25, 2002; and No. 2003-001462, filed Jan. 7, 2003. The entire contents of each of the foregoing three applications are incorporated herein by reference.

BACKGROUND OF THE INVENTION

1. Field of the Invention

The present invention relates to an electronic camera, and in particular to an electronic camera, an information device and a portable information apparatus designed to take private information of a user into consideration.

2. Description of the Related Art

One recent application of a digital camera (electronic camera) is for general users to deliver and circulate a photographed image among many persons. This is in view of the fact that an image obtained by an electronic camera can be checked on the monitor of the same camera.

In such a situation, however, an image other than those the user wants to circulate among other persons may be contained in the same camera, and may be undesirably viewed by other persons operating the camera in circulation.

In recent years, a camera into which the voice can be input has been available on the market. Although the image information is not exposed to other than the persons watching the monitor screen, the voice, if reproduced at the same time, like the ringing bell of the portable telephone sounding in the train or the like, troubles a multiplicity of unspecified persons and the telephone user may feel ashamed by the exposure of private information.

As described above, the same camera may contain both the information desired to be disclosed to others and the private information of the user. Inadvertent reproduction of private information may result in a trouble and therefore the reproduction of private information is better prevented.

The technique taking private situations into consideration when in use is disclosed, for example, in Jpn. Pat. Appln. KOKAI Publication No. 9-330325 in which private information such as a schedule and addresses are linked with images to facilitate search. Jpn. Pat. Appln. KOKAI Publication No. 2000-23015, on the other hand, discloses a technique used in a theme park or the like, in which the image management is simplified by adding ID information through a remote controller to a camera used by many persons. Other known techniques are disclosed in Jpn. Pat. Appln. KOKAI Publication No. 2001-320668, in which editing data is prohibited or data are recorded by encryption to keep confidential private information contained in a digital camera the use of which is shared by many persons, and Jpn. Pat. Appln. KOKAI Publication No. 2002-77700 employing measures (child lock) for protection from a malfunction which otherwise might be caused by the tampering by children.

BRIEF SUMMARY OF THE INVENTION

According to one aspect of this invention, there is provided an electronic camera configured to execute recording and reproduction of an image and a voice, in which information not desired to be disclosed to unspecified many persons such as private information and information allowed to be disclosed to unspecified many persons are discriminated from each other in the recording operation, and the information not desired to be disclosed cannot be reproduced unless a predetermined operation is performed.

According to another aspect of the invention, there is provided an electronic camera in which unnecessary images are not displayed on a display unit in circulation among unspecified many persons for human communication or information exchange using the reproduction functions of the camera to prevent complication of information and to protect private information.

A first feature of the invention is to provide an electronic camera comprising:
an imaging unit;
an image reproduction monitor;
an information input unit which adds private information at the time of photographing an image; and
a prohibition unit which prohibits the reproduction of an image on the image reproduction monitor in accordance with the private information.

A second feature of the invention is to provide an electronic camera comprising:
an imaging unit;
a display unit having a first image recording area and a second image recording area different from the first image recording area, the display unit displaying the image recorded in the first image recording area in priority;
a judgment unit which judges the private imaging operation at the time of imaging operation; and
a recording control unit which records information in the second image recording area in accordance with the judgment of the private imaging operation.

A third feature of the invention is to provide an electronic camera configured to execute recording and reproducing an image and a voice, comprising:
a selecting unit which adds private information at the time of recording, and selects one of a mode for reproducing only the image and a mode for reproducing both the image and the voice at the time of reproduction in accordance with the private information.

A fourth feature of the invention is to provide an electronic camera comprising:
an imaging unit;
an image recording unit;
an image reproduction monitor;
a designation switch which designates a recorded image being reproduced on the image reproduction monitor; and
a control unit which sets recorded images other than the designated reproduced image into the display prohibition state and thus prohibits the display thereof.

A fifth feature of the invention is to provide an information device comprising:
an information input unit;
an information recording unit; and
an information reproduction unit,
wherein the information recorded in the information recording unit is reproduced by the information reproduction unit in such a manner that the input of arbitrary information from the information input unit is prompted, and the degree of coincidence between the input information and a predetermined pattern is determined, and in the case where the degree of coincidence is high, the recorded information is reproduced.

A sixth feature of the invention is to provide a portable information apparatus comprising:

an input unit which inputs information including at least selected one of an image and a voice;

a storage unit which digitally stores the input information in nonvolatile form;

a reproduction unit which reproduces the information digitally stored;

a specifying unit which specifies at least one of the digital information stored in the storage unit; and a control unit which performs the control operation to reproduce by the reproduction unit only the digital information specified by the specifying unit.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 1A to 1D are diagrams for explaining an example of private images constituting the feature of the invention, in which FIG. 1A shows an example of a scene as a private image, FIG. 1B shows an example of images displayed as an index on a monitor of an electronic camera, FIG. 1C shows an example of images including private images displayed as an index on the monitor of the electronic camera, and FIG. 1D shows an example in which predetermined pixels are enlarged.

FIGS. 3A and 3B show an external configuration of the camera according to the first embodiment of the invention, in which FIG. 3A is a perspective view of the front surface and FIG. 3B is a perspective view of the back surface.

FIG. 7 is a flowchart for explaining still another example of the video and audio reproducing operation in which the image of private information is treated before reproduction without reproducing the voice.

FIG. 8 is a diagram showing an example of reproducing the voice through an earphone mounted on the camera body for selecting a private image.

FIG. 9 is a flowchart for explaining an example of the operation for reproducing private information with an earphone mounted on the camera body.

FIGS. 21A and 21B are diagrams for explaining an electronic camera according to a fourth embodiment of the invention.

FIG. 22 is a flowchart for explaining the operation of changing the display mode of the electronic camera according to the fourth embodiment of the invention.

FIGS. 26A and 26B are diagrams for explaining an electronic camera according to a sixth embodiment of the invention.

FIG. 27 is a flowchart for explaining the operation of an electronic camera in the private mode according to the sixth embodiment of the invention.

DETAILED DESCRIPTION OF THE INVENTION

Embodiments of the invention will be explained below with reference to the accompanying drawings.

First, the protection of private images and voices constituting the features of the invention is explained.

Figure 1A:
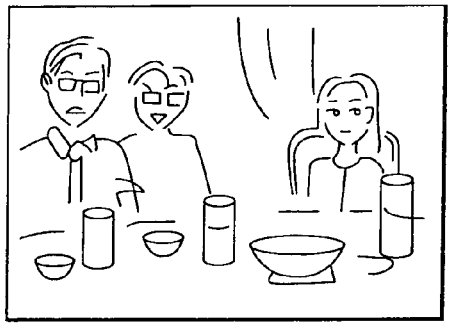

With the extension of ownership of the digital camera, the operation of fetching an image into a personal computer or the like has been simplified more and more. There are now increasingly many chances of taking a picture attached to a business report with a digital camera on a business trip or the like, or as shown in FIG. 1A, fostering friendship with colleagues using the digital camera at a social gathering held after the closing hour.

Under the circumstances, many persons have come to enjoy photographed images by reproducing them and circulating the digital camera on many occasions by taking advantage of its feature that each photographed image can be viewed in situ.

Figure 1B:
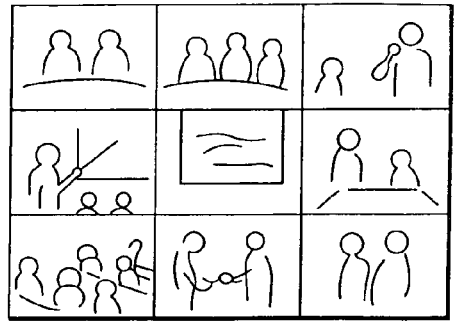

However, a private image not related to the business which may be stored in the memory is also often exposed undesirably to the eyes of unspecified many persons. In what is called indexed display of the images recorded in the respective frames, as shown in FIG. 1B, for example, private images are also reproduced.

Figure 1C:
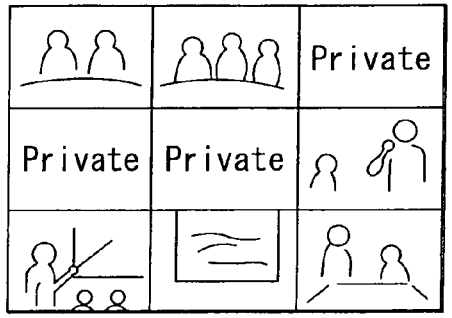
Figure 1D:
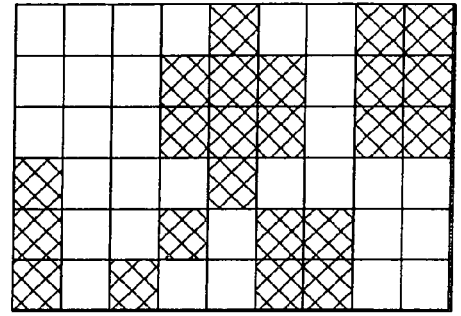

According to this invention, as shown in FIG. 1C, private images are rendered invisible and protected from the eyes of other persons as "private". An attempt to view these private images is defeated by enlarging predetermined pixels to recognizable degree as shown in FIG. 1D, or by rendering totally impossible to reproduce private images, or by totally preventing private images from being displayed on an index.

On the other hand, a camera which can record the voice as well as the image has come to be widely used in recent years. The voice, unlike the image, is exposed also to persons not facing the camera. The camera according to the invention, therefore, is designed not to reproduce private voices or to reduce the sound level in consideration of the above problem.

Figure 2:
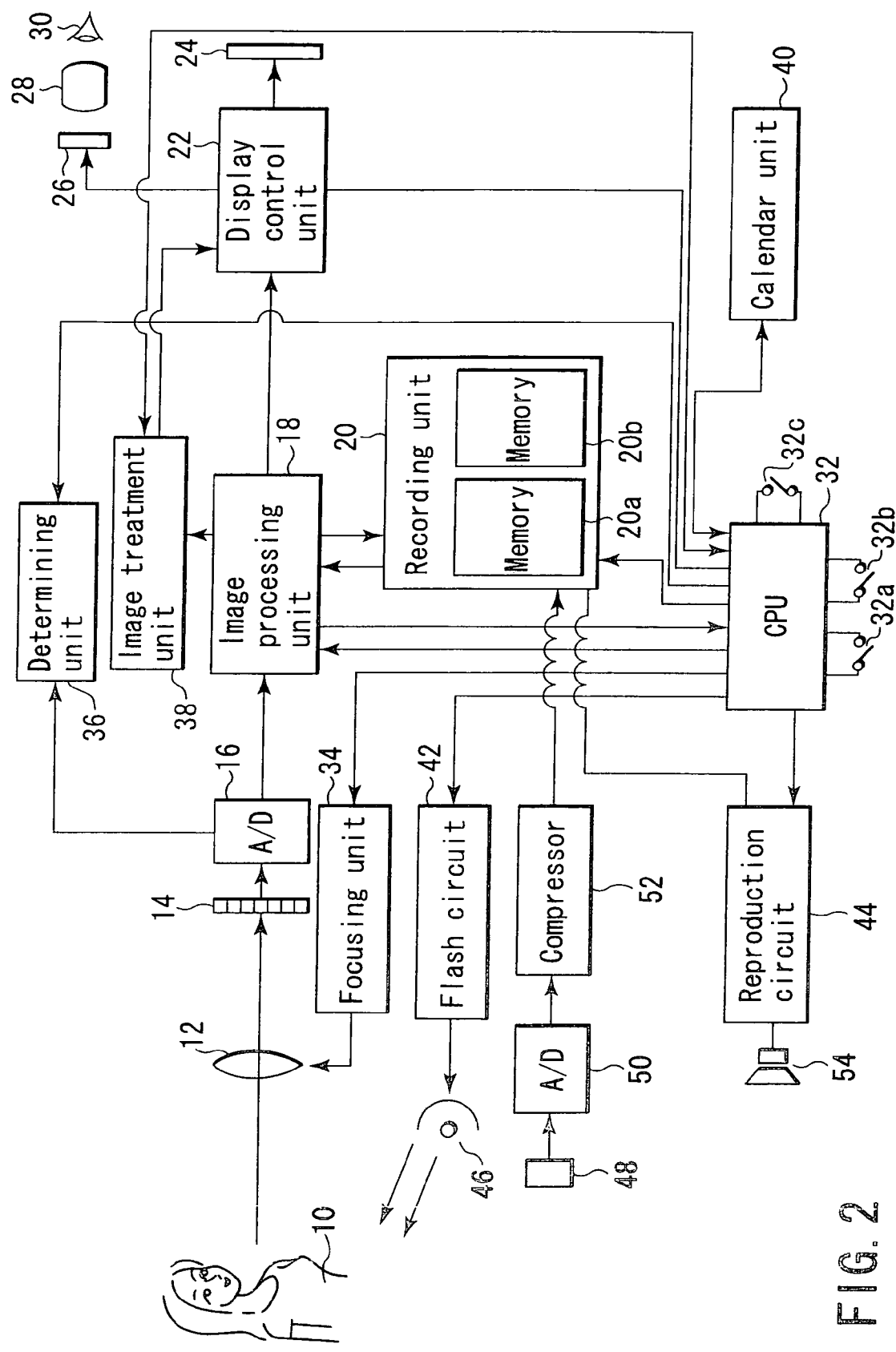
FIG. 2 is a block diagram showing a circuit configuration of a digital camera to which an electronic camera according to a first embodiment of the invention is applied.

FIG. 2 is a block diagram showing a configuration of a digital camera applicable as an electronic camera according to a first embodiment of the invention.

In FIG. 2, light fluxes of an image photographed from an object 10 enter an imaging device (image pickup device) 14 such as a CCD or a CMOS image sensor through an imaging lens 12, and is converted into an electrical signal. The electrical signal converted by the imaging device 14 is supplied to an image processing unit 18 through an A/D converter 16. The output of the image processing unit 18 is supplied to a recording unit 20 on the one hand and to an electronic display 26 in a finder eye piece 28 and a LCD panel 24 on the back of the camera through a display control unit 22 on the other hand.

A CPU 32 provides operation control means for controlling the whole camera, and is configured of a one-chip microcomputer and the like. The CPU 32 includes the image processing unit 18, the recording unit 20, the display control unit 22 described above, a focusing unit 34, a determining unit 36, an image treatment unit 38, a calendar unit 40, a flash circuit 42 and a reproducing circuit 44. Further, the CPU 32 includes switches 32b, 32c for photographing a private image constituting the feature of the invention, in addition to a release switch 32a for picking up an image.

The focusing unit 34 is constituted of an actuator or the like for controlling the focusing operation of the imaging lens 12. The determining unit 36 is for determining the operation of the camera. The image treatment unit 38 is for treating the image processed in the image processing unit 18, for example, by adding text data at the time of display on the LCD panel 24. Further, the calendar unit 40 is for updating and managing information such as the date.

The flash circuit 42 is for controlling the illumination of a flash light emitting unit 46 for complementing the insufficient exposure under the control of the CPU 32. A compression unit 52 is for compressing an audio input from a microphone 48 and converted by an A/D converter 50, in such a manner as to be recordable in the recording unit 20 with a small recording capacity. Further, the reproducing circuit 44 is for amplifying the voice recorded in the recording unit 20 and outputting it from a speaker 54.

Figure 3A:
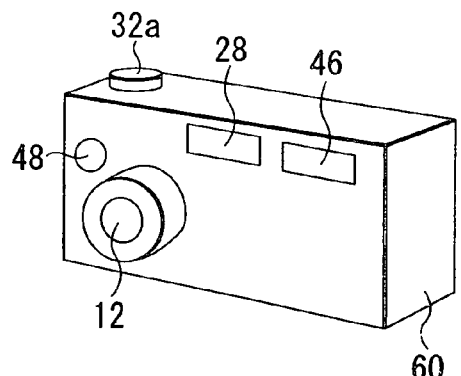
Figure 3B:
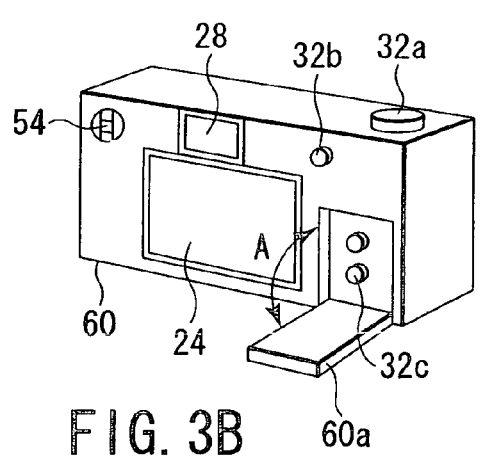

FIGS. 3A and 3B show an example of the external appearance of the camera according to the same embodiment. FIG. 3A is a perspective view of the front side and FIG. 3B is a perspective view of the back side of the camera.

A camera body 60 has, on the front side thereof the imaging lens 12, the voice input microphone 48 and the flash light emitting unit 46. The release switch (release button) 32a for photographing an image is arranged on the upper surface of the camera body 60.

The switches 32b, 32c for photographing a private image constituting the features of the invention are arranged on the back side of the camera body 60, in addition to the finder eye piece 28, the back LCD panel 24 and the speaker 54. The switch 32c, as shown in FIG. 30B, may be arranged to be invisible unless a cover 60a arranged openably along the direction of arrow A on a part of the exterior of the camera body 60 is opened.

At the time of picking up an image with the digital camera having this configuration, the image of the object 10 enters the imaging device 14 by way of the imaging lens 12 and is converted into an electrical signal. The electrical signal thus converted is converted into a digital signal by the A/D converter 16, and then input to the image processing unit 18. This image processing unit 18 performs such an operation as color correction and edge emphasis, and the information, after being compressed, is recorded in the recording unit 20. The recorded information is displayed on the LCD panel 24 or the electronic display 26 through the display control unit 22. As a result, the user can observe the image by his own eyes 30.

Also, in this camera, the input operation (operating conditions) of the switches 32a, 32b, 32c is detected by the CPU 32, so that the imaging sequence and the various imaging modes are set.

Further, the focusing control operation of the imaging lens 12 is performed by the CPU 32 through the focusing unit 34 by use of part of the image processing information. Also, in order to complement the insufficient exposure, the illumination of the flash light emitting unit 42 is controlled by the CPU 32 through the flash circuit 42.

Similarly, the voice information input by way of the microphone 48, like the image, is A/D converted by the A/D converter 50 and compressed by the reduction unit 52 into a form recordable in the recording unit 20.

The image and the voice thus recorded are read as predetermined data from the recording unit 20 in the case where the CPU 32 determines that the user camera operation is in the reproduction mode. The image is then displayed on the LCD panel 24 or the electronic display 26 through the display control unit 22. The voice, on the other hand, is adapted to be reproduced from the speaker 54 through the reproducing circuit 44.

The image processing unit 18 has the image treatment unit 38 which can display a treated image or text data or the like in place of an image. The CPU 32 can activate the image processing unit 18 including the image treatment unit 38 by use of the information of the calendar unit 40 for updating and managing the information such as the date.

The recording unit 20 may be configured to include two different memory areas 20a, 20b. By this design, the private image and the normal image may be recorded in different memory areas and the contents of the memory area for the normal image may be displayed in priority. According to this method, it is easy for the private images not to be displayed in the index as shown in FIG. 1B. In other words, the contents of only one of the memory areas are read at the time of reproduction.

Also, as shown in FIG. 1C, the images including private images may be displayed in chronological order in an index to facilitate the image management by the user. In such a case, the word "private" is displayed in each private image section of the index, or as shown in FIG. 1D, the private image is uniformly displayed in a wide range with predetermined pixel signals by the functions of the image treatment unit 38.

Figure 4:
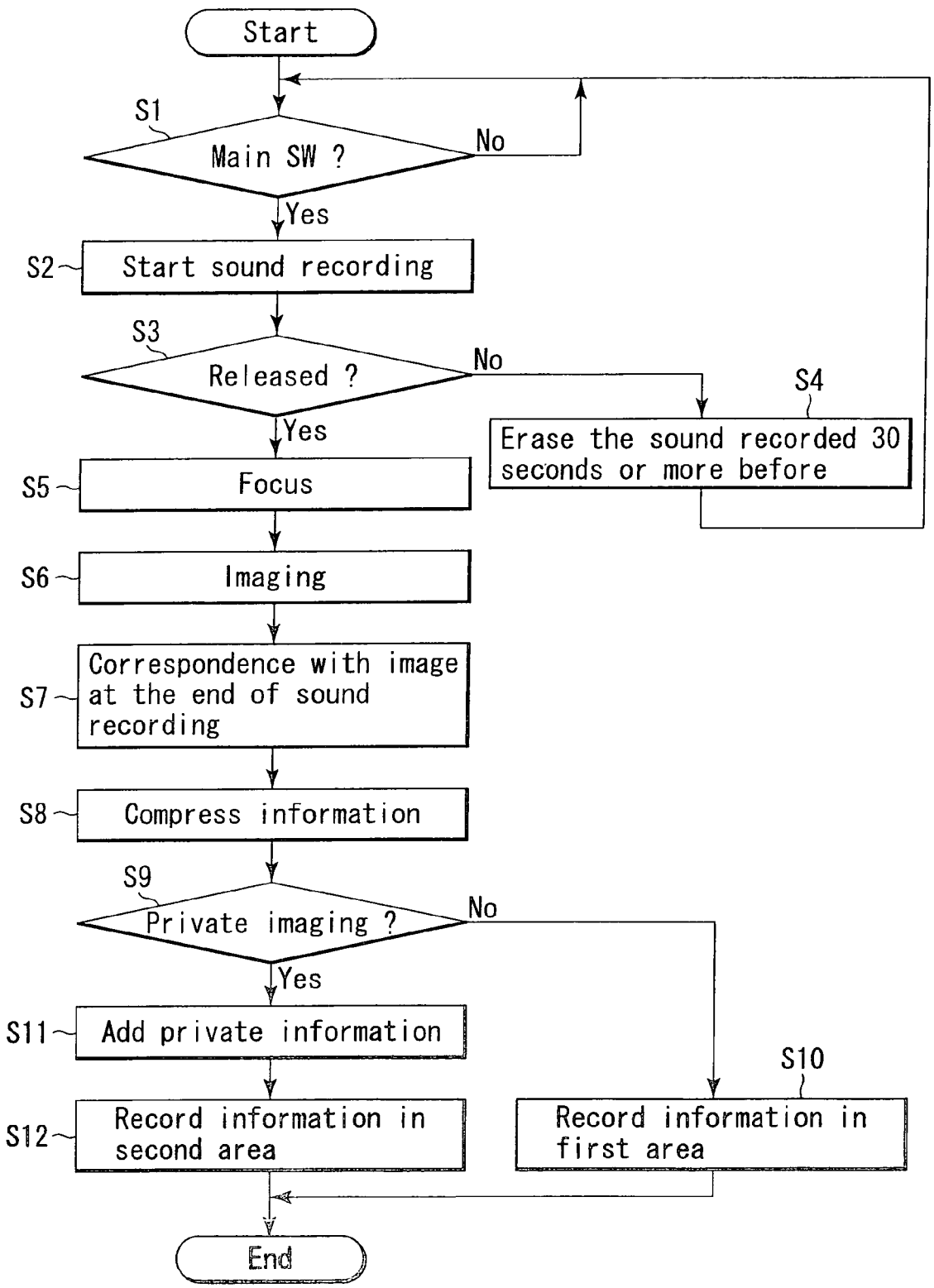
FIG. 4 is a flowchart for explaining the operation sequence of the camera in imaging operation according to the first embodiment of the invention.

FIG. 4 is a flowchart for explaining the sequence of the imaging operation of the camera having the aforementioned configuration. This sequence is controlled by the CPU 32 according to a program incorporated therein.

First, in step S1, it is determined whether the main switch of the camera is turned on or not. This main switch is represented by the switch 32b described above, etc. Once the main switch is turned on, the recording operation is started in step S2.

It is determined in step S3 whether the release button 32a is depressed or not. When the release button 32a is not depressed, the process proceeds to step S4 to erase the information recorded, for example, 30 seconds ago. This is by reason of the fact that if the recording operation is continued after turning on the main switch, the recording capacity of the memory would be depleted. Therefore, the voice recorded 30 seconds ago or more is erased and overwritten. Thereafter, the process proceeds to step S1.

When the release button 32a is depressed in step S3, on the other hand, the imaging sequence in and after step S5 is executed.

Specifically, in step S5, the focusing operation is carried out, followed by step S6 in which the imaging process is executed. After the imaging operation, the sound recording operation is completed in step S7 for correspondence with the image. Nevertheless, the sound recording operation may be continued for some time.

In step S4, the voice recorded 30 seconds ago or more is erased and overwritten so as to prevent the storage capacity of the memory from being depleted, as explained above. In step S8, however, the image and the audio information obtained in steps S2 to S7 are compressed.

Then, in step S9, it is determined whether the imaging operation is private or not. When the imaging operation is not private, the process proceeds to step S10, where the information is recorded in a first area (for example, the memory area 20a) in the recording unit 20.

When it is determined that the imaging operation is private in step S9, on the other hand, the process proceeds to step S11 for adding the information indicating privacy. In this case, the password of the imaging person or the recording date or time may be added. Then, in step S12, the information is recorded in a second area (for example, the memory area 20b) in the recording unit 20.

Whether the imaging operation is private or not may alternatively be determined by the mode setting operation of the switch 32c or the like of the camera body 60. As another alternative, a predetermined mode-setting operation may be performed at the time of imaging, as described later.

The reproduction of the information thus obtained is explained with reference to the flowcharts shown in FIGS. 5 to 7.

Figure 5:
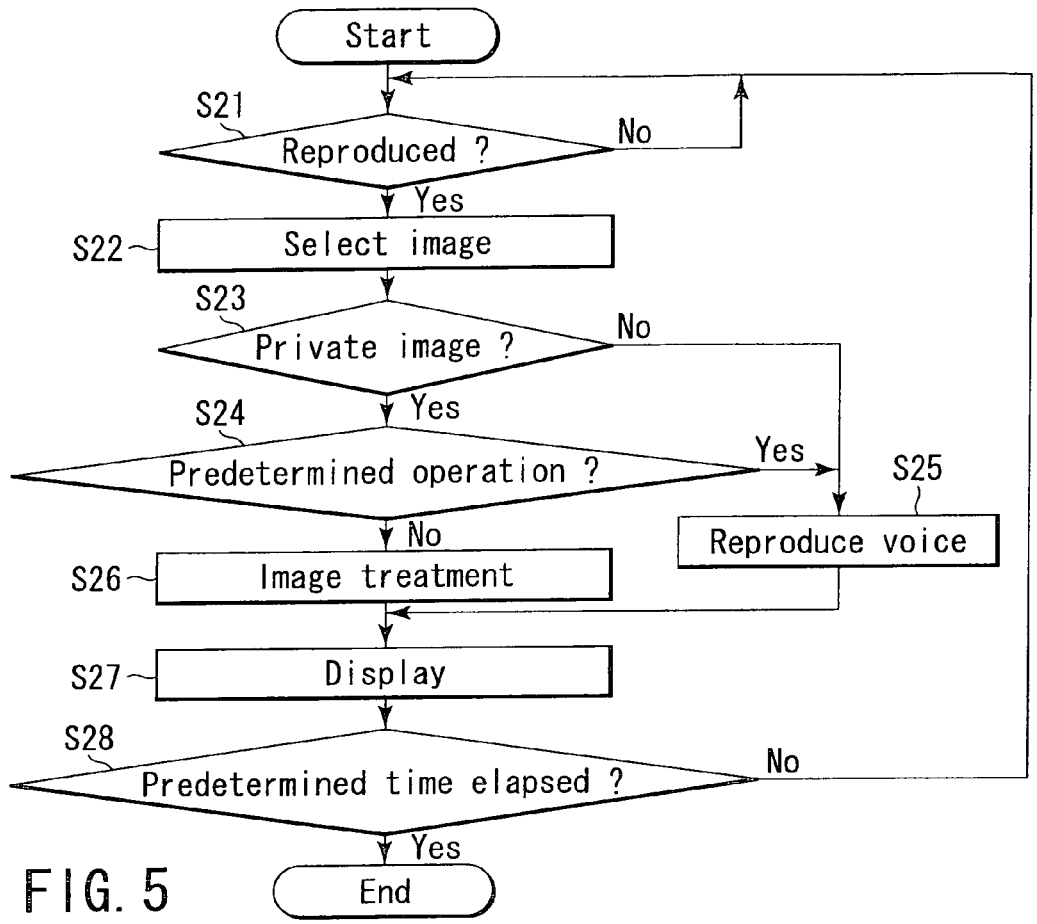
FIG. 5 is a flowchart for explaining an example of the video and audio reproducing operation in which an image of private information is treated before reproduction without reproducing a voice.

FIG. 5 is a flowchart for explaining the operation performed in the case where the image of private information is treated and reproduced, while the voice is not reproduced. This is to prevent unspecified many persons in the train or the like from being troubled by simultaneous voice reproduction.

First, in step S21, the operation in the reproduction mode is determined. Then, in step S22, the image to be reproduced is selected (the image screen in the previous session is automatically selected or the image is selected from the index displayed as shown in FIG. 1C).

In step S23, it is determined whether the image is private or not. When the image contains a private image, it is determined in step S24 whether a predetermined operation has been performed or not.

When it is determined in step S23 that no private image is contained or when a predetermined operation is performed in step S24, the process proceeds to step S25 for reproducing the voice. Thereafter, the process proceeds to step S27.

When it is determined that a private image is contained in step S23 and a predetermined operation is not performed in step S24, on the other hand, the process proceeds to step S26 where the image is treated appropriately.

When a predetermined operation is not performed in step S24, neither the voice nor the image is reproduced correctly. In other words, only the image treated in step S26 is displayed. The treated image, as shown in FIG. 1C, may be only text information as shown in a part of the monitor screen, or in an unidentifiable state as shown in FIG. 1D.

Next, in step S27, the image is reproduced and displayed. The voice is completely reproduced by the end of information, while the image continues to be displayed for a predetermined length of time. From step S28, the process proceeds to step S21 before the lapse of a predetermined length of time, and the process of steps S21 to S28 is repeated. Upon the lapse of the predetermined length of time, the sequence is terminated.

Figure 6:
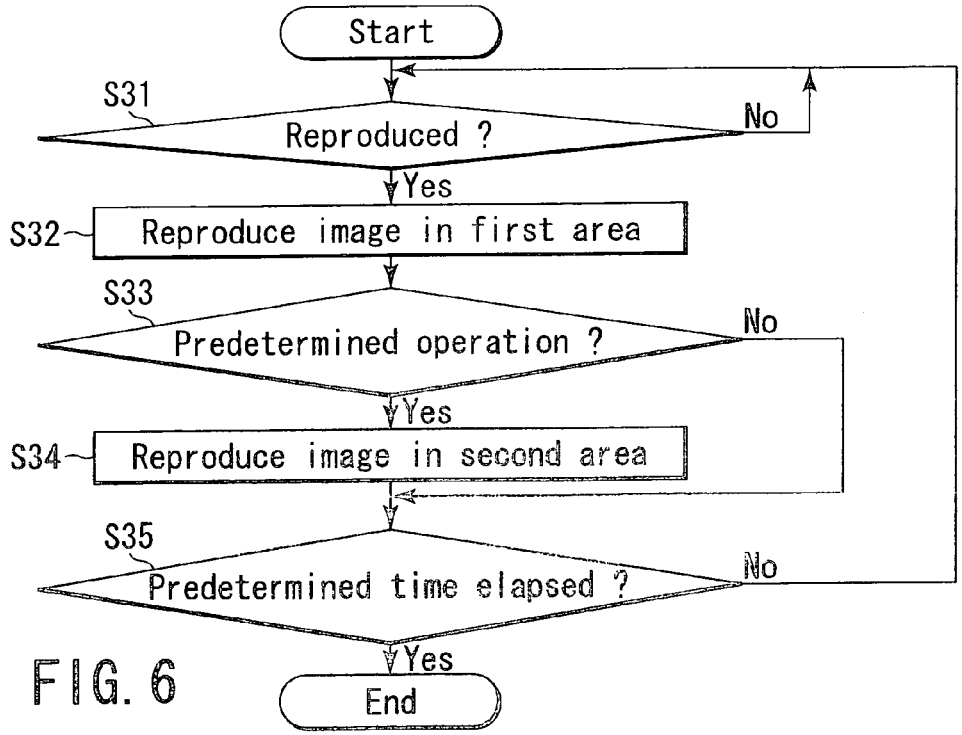
FIG. 6 is a flowchart for explaining another example of the video and audio reproducing operation in which the image of private information is treated before reproduction without reproducing the voice.

In place of the sequence shown in FIG. 5, the reproduction program shown in FIG. 6 may be employed.

In this case, the reproduction mode is determined in step S31 first of all. Upon entrance of the reproduction mode, only the image in the first recording area shown as the memory area 20a in the recording unit 20 is reproduced in the next step S32. Then, in step S33, it is determined whether a predetermined operation has been performed or not.

When a predetermined operation has been performed, the process proceeds to step S34, where the image in the second recording area shown as the memory area 20b in the recording unit 20 is reproduced. Unless a predetermined operation is performed in step S33, on the other hand, the process skips step S34 so as not to reproduce the image from the second recording area. This is effective for total prohibition of displaying the private images as shown in FIG. 1B.

Before the lapse of a predetermined length of time in step S35, the process proceeds to step S31, so that the process of steps S31 to S35 is repeated. Upon the lapse of the predetermined length of time, this sequence is terminated.

The first and second areas described above correspond to steps S10 and S12, respectively, in the flowchart of FIG. 4.

Further, the reproduction program as shown in FIG. 7 may be used.

Specifically, it is determined in step S41 whether the reproduction mode prevails or not. Once the reproduction mode is entered, the part to be displayed is switched in accordance with the selected image in the next step S42.

It is determined in step S43 whether the image is private or not. When the selected image is not private, the process proceeds to step S44, while when the image is private, the process proceeds to step S46.

In step S44, the image is displayed and reproduced on the LCD panel 24 on the back of the camera body 60 to allow many persons to enjoy the image. In step S45, the voice is also reproduced in normal volume.

The image in the private recording area or the image with private information added thereto is displayed only on the electronic display 26 in the finder eye piece 28 in step S46. As a result, the image can be checked only in the camera finder, and therefore prevented from being exposed to the eyes of many persons on the large-sized monitor on the back of the camera.

In the next step S47, the voice is also reproduced in a small volume so as not to be audible to many persons.

Before the lapse of a predetermined length of time in step S48, the process is passed from step S48 to step S41, so that the process of steps S41 to S48 is repeated. Upon the lapse of the predetermined length of time, this sequence is terminated.

At the time of selecting a private image, the reproduction operation may be performed through the earphone instead of reducing the sound volume. Specifically, as shown in FIG. 8, an earphone 64 is mounted on an earphone jack 62 of the camera body 60. Only in this state, the private information can be reproduced to the user 66.

In this case, the operation is performed in accordance with the sequence shown in FIG. 9.

Specifically, it is determined in step S51 whether the information is private or not. When the information is not private, it is normally reproduced in step S53. When it is determined in step S51 that the information is private, on the other hand, the process proceeds to step S52.

In step S52, it is determined whether the earphone 64 is mounted on the earphone jack 62 of the camera body 60. When the earphone 64 is so mounted, the process proceeds to step S53 where the reproduction is possible. When the earphone 64 is not so mounted, on the other hand, this sequence is terminated without reproduction.

As explained above, the aforementioned reproduction method can provide a camera by which ordinary information can be enjoyed by many persons while private information cannot be easily reproduced.

Figure 10:
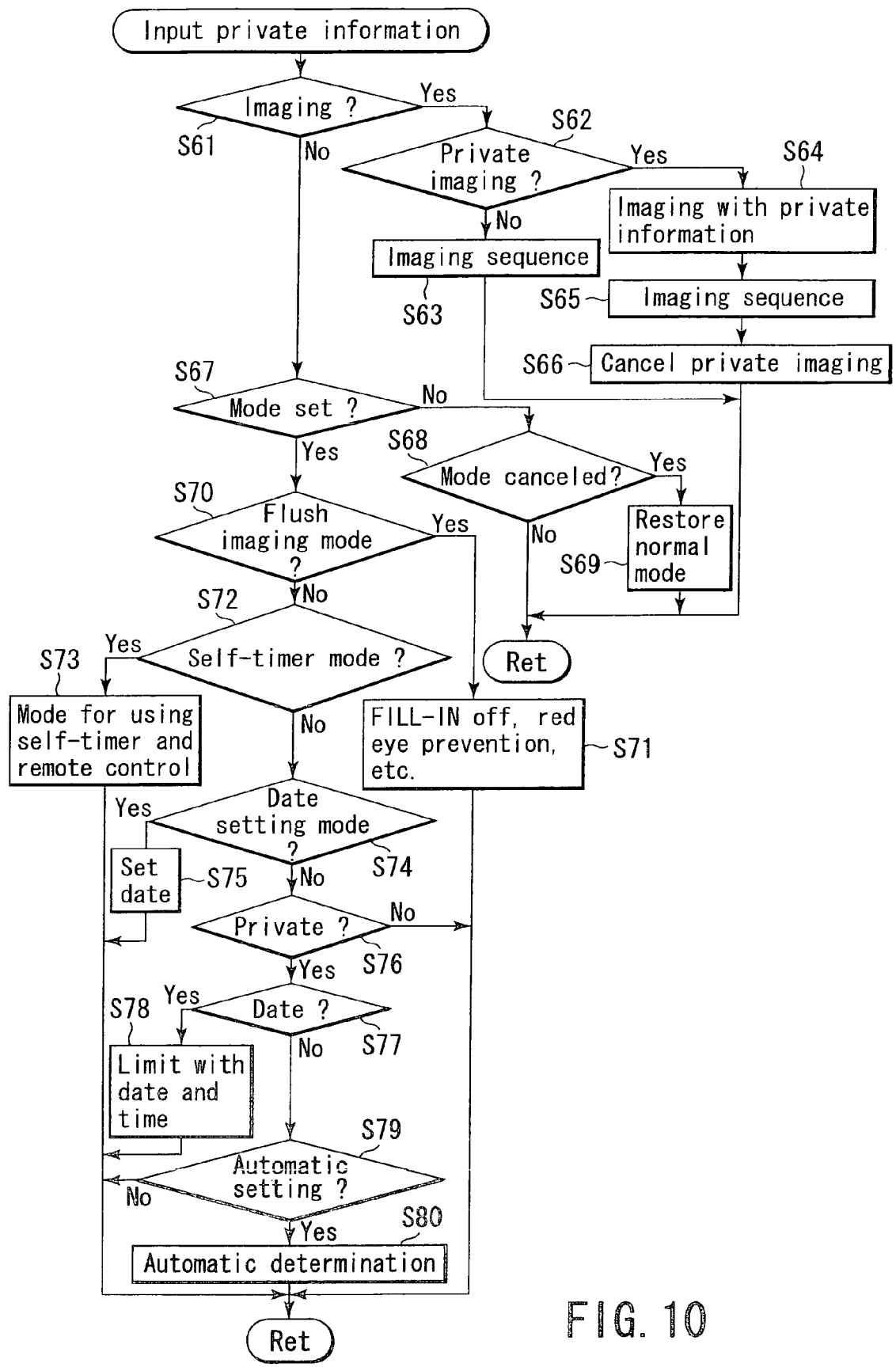
FIG. 10 is a flowchart for explaining the operation of determining private information.

The function of determining whether given information is private or not can be added by the CPU 32 executing the operation sequence as shown in FIG. 10, for example.

Specifically, first, it is determined in step S61 whether the imaging operation has been started or not. When the imaging operation is started, the process proceeds to step S62. Otherwise, the process proceeds to step S67.

It is determined in step S62 whether the imaging operation is private or not. This is determined, for example, from whether the private switch (the switch 32b, for example, shown in FIGS. 1 and 3) mounted on the camera has been depressed or not. When the private switch 32b is not depressed, the process proceeds to step S63 where normal imaging sequence is executed. Thereafter, the main routine is left.

When the private switch 32b is depressed, on the other hand, the process proceeds to step S64 thereby making it possible to photograph an image with private information. Thereafter, the imaging operation is performed in step S65. In step S66, the private imaging mode is canceled after one imaging session. Thus, the private information can be obtained only when required.

When it is determined in step S61 that the imaging mode is not prevailing, it is determined in step S67 whether the camera is set in a mode or not. When the camera is not set to any mode, the process returns to step S68 to determine whether the mode is canceled or not.

It is determined in step S68 whether the mode is canceled or not. When the mode is not canceled, the process leaves the main routine. When the mode is canceled, on the other hand, the process proceeds to step S69 for restoring the normal mode, after which the process leaves the main routine.

By eliminating the need of depressing the switch each time of imaging operation, the information produced by a series of imaging operation can be privatized. The private imaging mode can be incorporated as one mode using the switch 32c or the like arranged on the inside of the cover of the camera body 60.

Once the mode is set in step S67, the process proceeds to step S70 for determining whether or not the flash imaging mode is involved to select the private imaging mode. When the flash imaging mode prevails, the process proceeds to step S71, where the forcible illumination mode (FILL-IN), the off mode, the red eye prevention mode or any other one of various modes for flash illumination is set, after which the process leaves the main routine.

When the flash imaging mode is not prevailing, on the other hand, the process proceeds to step S72 for determining whether the self-timer mode is prevailing or not. When the self-timer mode is prevailing, the process proceeds to step S73 for setting the mode for using the self-timer or the remote controller.

When the self-timer mode is not prevailing in step S72, the process proceeds to step S74 for determining whether the date setting mode prevails or not. When the date setting mode is not prevailing, the process proceeds to step S75 for setting the information such as the corresponding date. Thereafter, the process leaves the main routine.

When the date setting mode is not prevailing, the process proceeds to step S76, where it is determined whether the private imaging mode prevails or not. When no private imaging mode prevails, the process leaves the main routine. When the private imaging mode prevails, on the other hand, the process proceeds to step S77.

In step S77, it is determined whether the private imaging operation is set as related to the date information. In the case where the private imaging operation is set as related to the date information, the process proceeds to step S78, in which a predetermined date and time, time zone, etc. can be selected as related to the date information of the date function of the calendar unit 40, for example. As a result, the image recorded in the particular time zone can be set as a private image. Thereafter, the main routine is left.

When the imaging operation is not related to the date information in step S77, on the other hand, it is determined in step S79 whether the private imaging operation is set in the automatic mode or not. Unless set in automatic mode, the main routine is left, while when the private imaging operation is set in automatic mode, the process proceeds to step S80. In this case, the main routine is left also after the automatic mode is set.

Next, the operation of setting the mode for automatic determining private information is explained with reference to FIGS. 11A to 11C and FIG. 12.

Figure 11A:
FIGS. 11A to 11C are diagrams for explaining the setting of a mode for automatically determining private information.
Figure 11B:
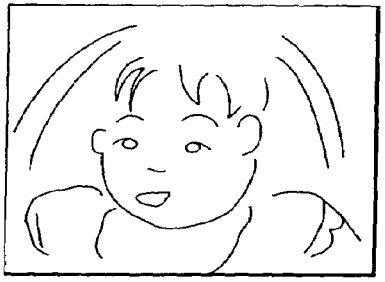
Figure 11C:
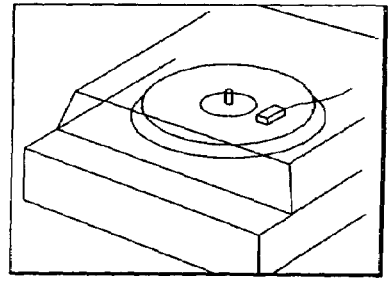

As shown in FIGS. 11A and 11B, for example, the image of a person photographed in portrait form enlarged to a predetermined size (magnification) or more is generally considered a private photo. The photo enjoyed by many persons is that of a scene, for example, shown in FIG. 1A and often contains a plurality of persons.

Also, as shown in FIG. 1C, a large close-up photo of a specific machine, equipment or a printed matter is frequently used for business. This is distinguished as a "macrograph".

Figure 12:
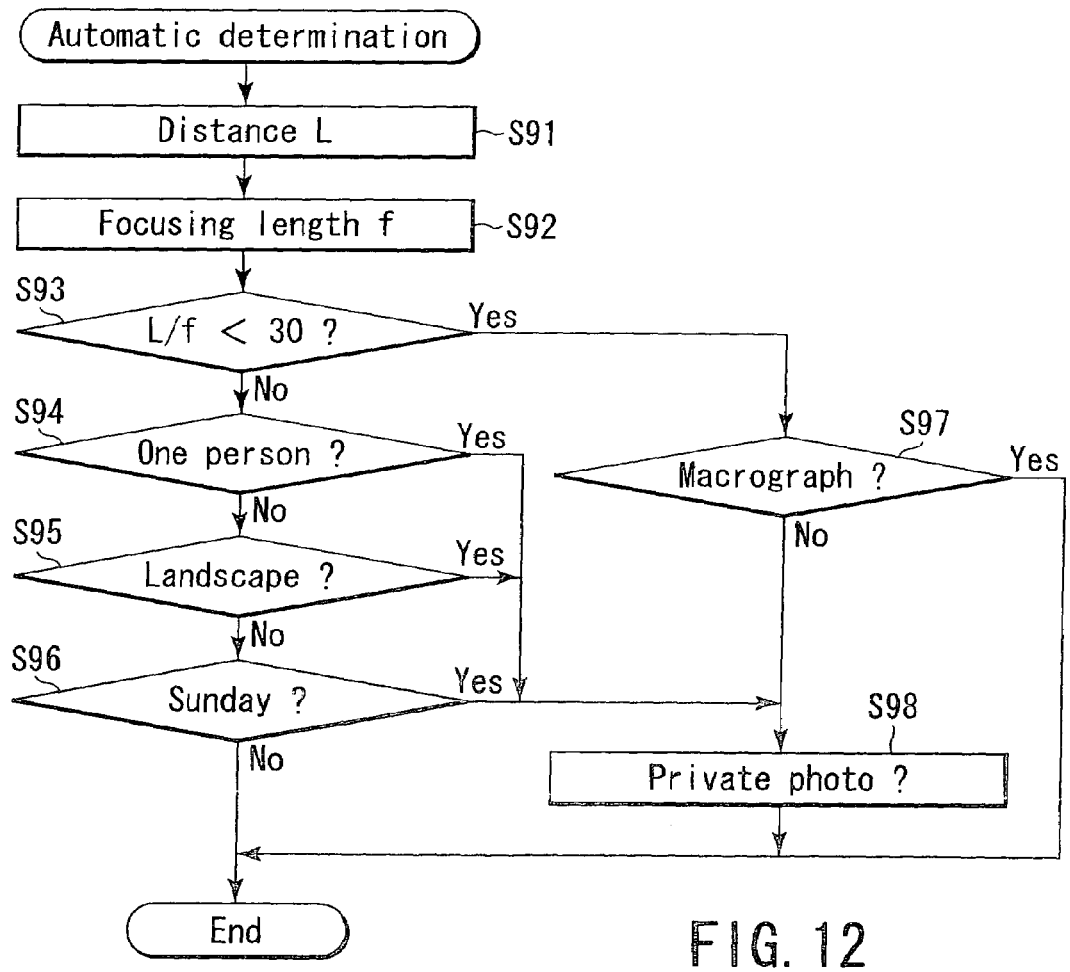
FIG. 12 is a flowchart for explaining the operation of setting the mode of automatic determination of private information.

FIG. 12 is a flowchart for explaining the operation of setting the mode for automatically determining a private image taking the aforementioned matter into consideration.

Specifically, in steps S91 and S92, the distance L of an object at the time of photographing the image thereof and the focal length f of the imaging lens are taken into consideration. In step S93, L/f is calculated from the distance L of the object and the focal length f, and compared with a predetermined ratio "30". When L/f is not smaller than the predetermined ratio, the photo is determined as private and the process proceeds to step S94. When the value L/f is smaller than the predetermined ratio, on the other hand, the process proceeds to step S97.

In step S97, it is determined whether the photo is a macrograph or not. When the photo is a macrograph, the main routine is left, while when the photo is not a macrograph, on the other hand, the process proceeds to step S98. In step S98, the operation is set for a private photo and the main routine is left.

As another example, a photo is most probably a private one in the case where the analysis of the shape of the person imaged in the photo or the voice recorded shows that only one person is involved.

In step S94, therefore, it is determined whether the object to be imaged is a single person or not. When the object of imaging operation is a single person, it is determined as a private photo and the process proceeds to step S98.

When no single person is involved, on the other hand, it is determined in the next step S95 whether the photo is an image of a landscape or not. The landscape photo may also be a private photo with high probability, which can be determined from the distance of the object. Thus, a landscape photo is regarded as a private one, and the process proceeds to step S98.

When it is determined that a photo is not that of a landscape in step S95, it is determined in step S96 whether the date when the image is photographed is Sunday or not. The photo taken on Sunday is often private information, and therefore determined as private. In the case where the date when the image is photographed is Sunday, therefore, the process proceeds to step S98 for setting the mode for processing a private photo.

As described above, once a camera specification is selected to automatically determine given information meeting predetermined conditions as private, then, without any mode setting operation each time, the information that can be enjoyed by many persons and the information to be enjoyed personally are discriminated automatically from each other.

Figure 13:
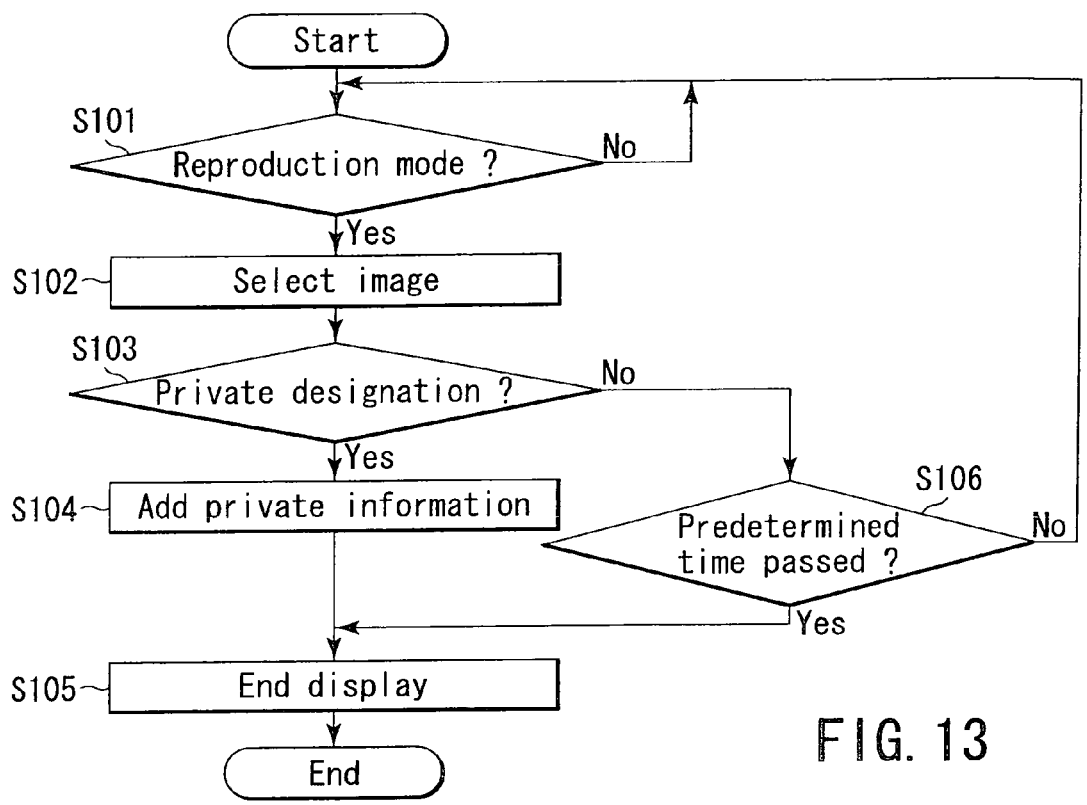
FIG. 13 is a flowchart for explaining the operation of designating a private image at the time of reproduction after the image is photographed.

The foregoing embodiments refer to a case in which the private mode is selected at the time of photographing an image. Alternatively, a camera specification may be selected to designate a private image at the time of reproduction after imaging operation. In that case, the operation sequence shown in FIG. 13 is built in the program of the CPU 32.

Specifically, when the reproduction mode is selected in step S101, a specific image is selected by the user in the next step S102. In step S103, it is determined whether the selected image is private or not.

Once an image is designated as private, i.e. a predetermined camera operation is performed, the process proceeds to step S104 for adding the private information. At the same time, the image immediately ceases to be displayed in step S105. The camera with this operation completed can be circulated safely among other persons to show other than the private image.

When no image is designated as private in step S103, the process proceeds to step S105, so that the process of steps S101 to S106 is repeated until the lapse of a predetermined length of time. Upon the lapse of the predetermined length of time, the process proceeds to step S105 where the display is terminated.

Figure 14:
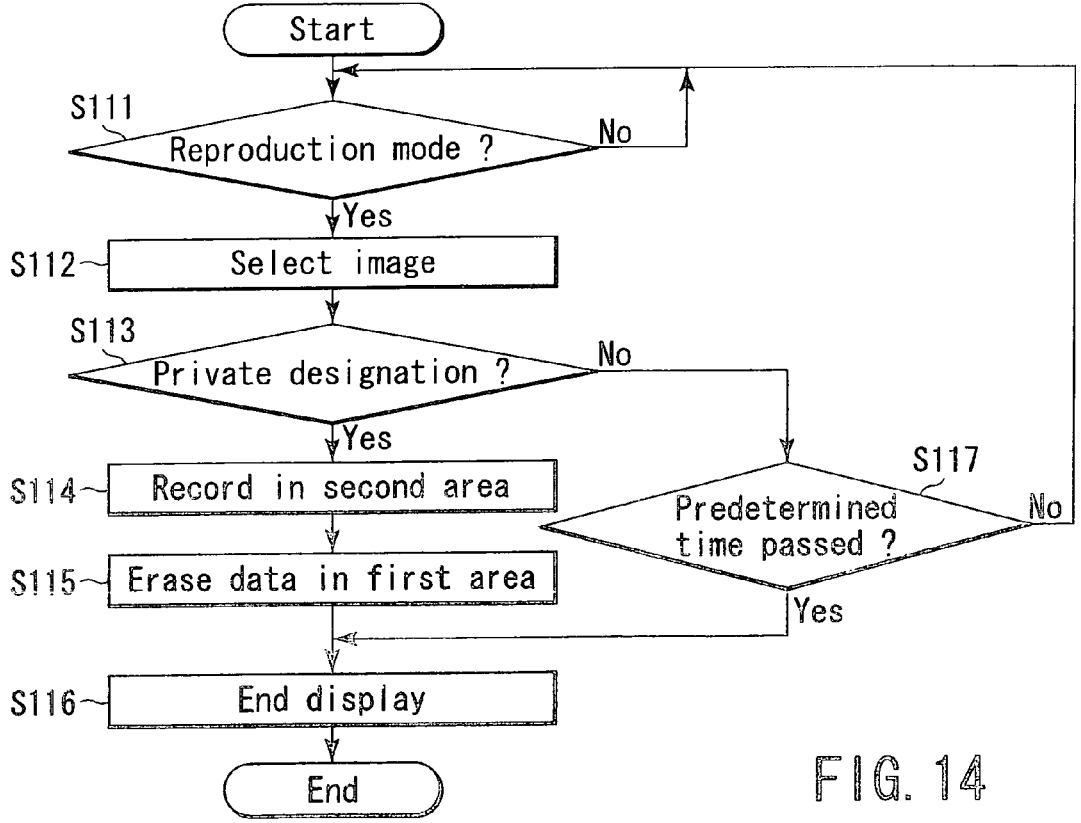
FIG. 14 is a flowchart for explaining the operation of recording a private image in an entirely different area of the recording unit.

Further, in the case where the selected camera specification is such that a private image is recorded in an entirely different area of the recording unit, the program of the operation sequence shown in FIG. 14 is executed.

Specifically, first in step S111, it is determined whether the reproduction mode prevails or not. When the reproduction mode prevails, a desired image is selected by the user in step S112. It is determined in step S113 whether the selected image is designated as private or not.

When it is determined that the image is designated as private, i.e. a predetermined camera operation is designated to be performed, the process proceeds to step S114, where the predetermined camera operation is performed for the selectively designated image. In this way, the image that has so far been stored in the first recording area is transferred to the second area for privacy protection. Then, in step S115, the data in the first area is erased. As a result, the particular image is converted to data invisible from others, and the display is ended in step S116.

When no image is designated as private in step S113, the process proceeds to step S117, and the process of steps S111 to S117 is repeated until the lapse of a predetermined length of time. Once the predetermined length of time is passed, the process proceeds to step S116 to end the display.

In viewing a private image, the program of the CPU 32 is designed to make it possible to display the image by inputting a predetermined password as in the personal computer or by designating a predetermined numerical value using a date indication counter.

As described above, according to the first embodiment, there is provided an electronic camera configured to execute recording and reproducing video and audio information, in which private information or the like of which the disclosure to unspecified many persons is not desired and information which may be safely disclosed to many persons are recorded discriminately from each other, and information of which the disclosure is not desired cannot be reproduced without performing a predetermined operation. Thus, information other than private information can be reproduced and enjoyed by many persons while at the same time protecting the private information.

Next, a second embodiment of the invention is explained.

First, the display and the protection of a private image in a digital camera are described.

The digital camera, with its advantage that a photo image can be viewed immediately after being taken, has come to play an increasingly important role on many occasions including parties and meetings. On the other hand, the use of a digital camera having the built-in recording and reproduction functions is spreading. On such occasions, assume that irrelevant information are mixed in a built-in memory. The image and the voice of the particular information may be inconveniently reproduced and exposed to unspecified many persons.

Even in such a situation, according to the invention, the information other than pre-selected images and voices are protected by making it impossible to reproduce the particular information without a predetermined operation.

Figure 15A:
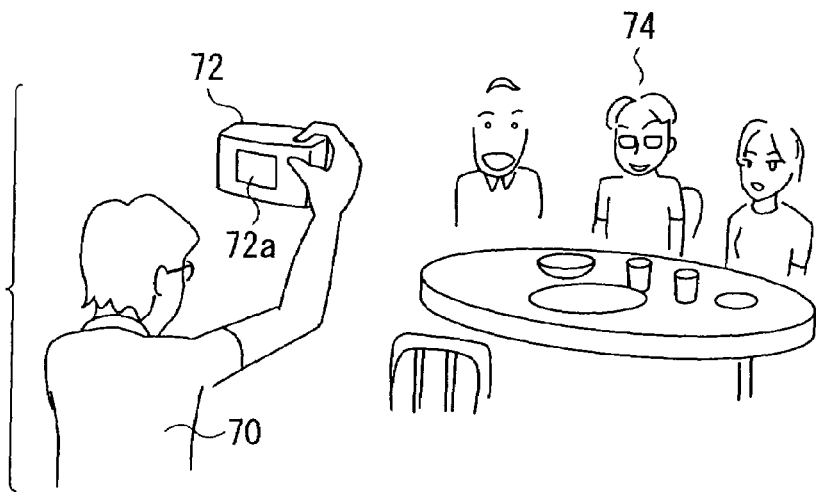
FIG. 15A is a diagram showing an example of a user photographing an image of an object.
Figure 15B:
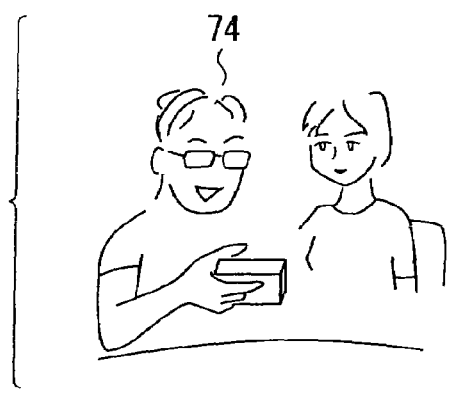
FIG. 15B is a diagram showing an example of the user watching the monitor.
Figure 15C:
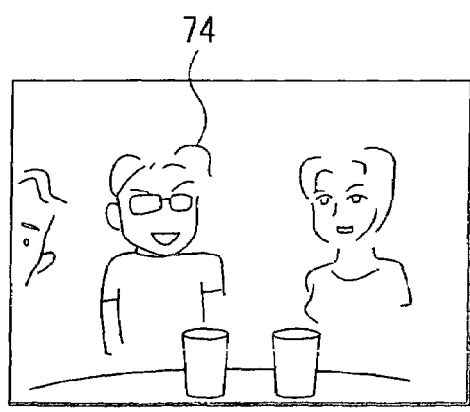
FIG. 15C is a diagram showing an example of display on the monitor.

For example, consider a situation as shown in FIG. 15A in which a user 70 takes a picture of an object 74 at a gathering of business colleagues using a camera 72. As shown in FIG. 15B, the person (object) 74 whose picture is taken often enjoys the image on a monitor 72a on the back of the camera, which image is displayed on the monitor 72a, for example, as shown in FIG. 15C.

Figure 15D:
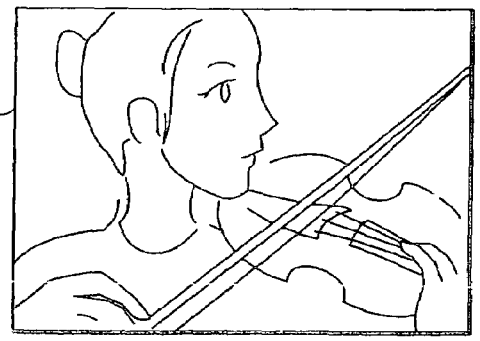
FIG. 15D is a diagram showing an example of a private image displayed on the monitor.

In such a case, the user 70 may feel ashamed in the event that a picture taken on a different occasion by the user as a hobby happens to be displayed on the monitor 72a as shown in FIG. 15D. Or the user, for fear of such a happening, may hesitate to show the image of the particular colleague to others, thereby inconveniently limiting the enjoyable use of the digital camera. As a result, the user cannot make the most of the features of the product.

A configuration of the digital camera according to the second embodiment of the invention is shown in the block diagram of FIG. 2, and the external appearance of the camera is shown in FIGS. 3A and 3B. These diagrams are identical to the corresponding diagrams of the first embodiment.

Specifically, the configuration of the camera according to the second embodiment is identical to the configuration shown in the block diagram of FIG. 2, and the external appearance is identical to that shown in FIGS. 3A and 3B. Therefore, the same component parts are designated by the same reference numerals, respectively and are neither shown nor described. Only different parts of the configuration and the operation are described below.

Figure 16:
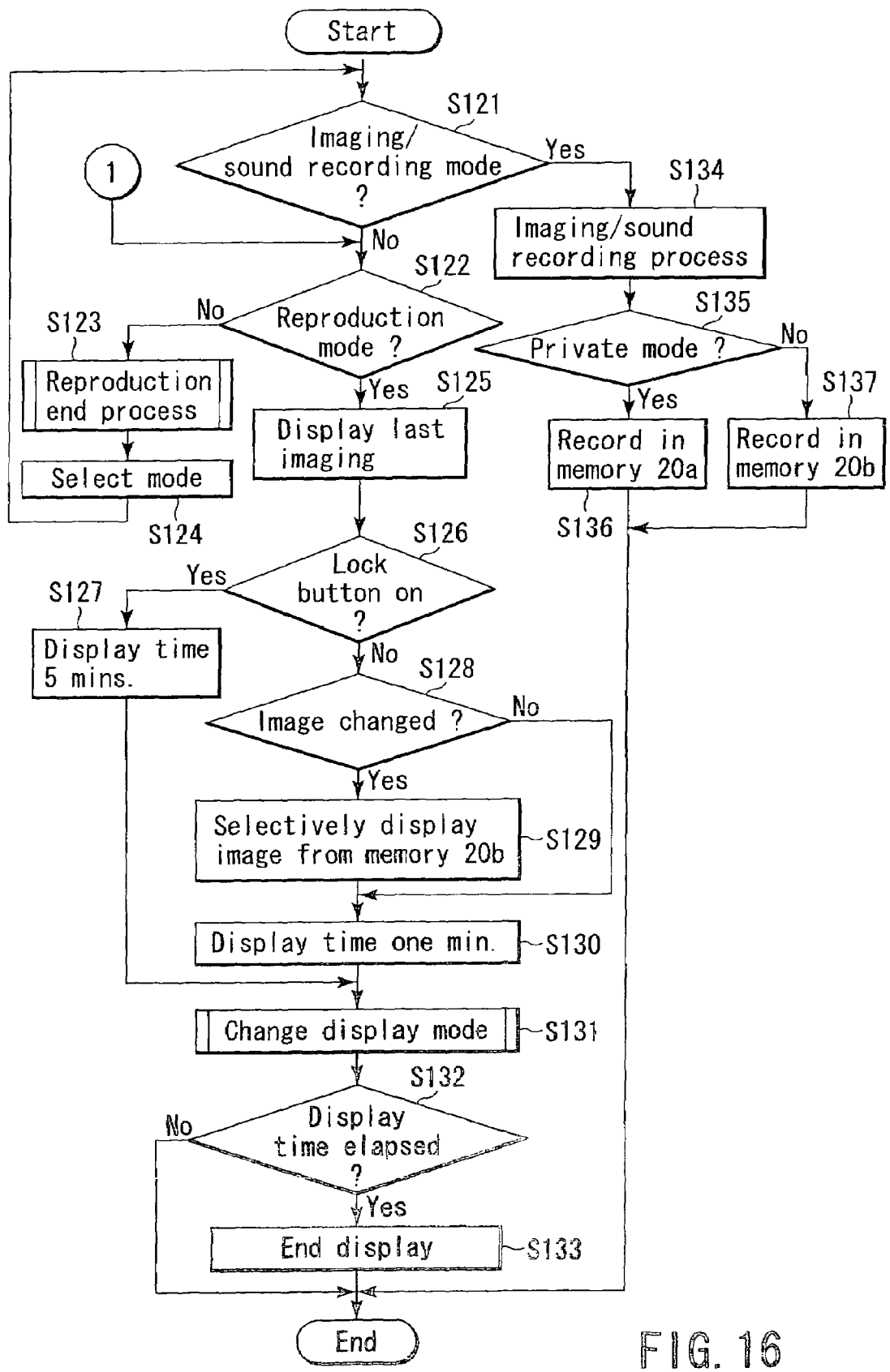
FIG. 16 is a flowchart for explaining the control operation of a digital camera according to a second embodiment of the invention.

With reference to the flowchart of FIG. 16, the control operation for the digital camera according to the second embodiment of the invention is described.

First, in steps S121 and S122, the operation of the release switch (release button) 32a or a mode select button is detected by the CPU 32. Specifically, when it is determined in step S121 that the imaging mode or the recording mode prevails, the process is transferred to step S134 for photographing an image or recording the sound.

The imaging operation or the sound recording operation is followed by step S135 for determining whether the private mode is selected by the mode selecting process or not. When the private mode is selected, the process proceeds to step S136, and the data is recorded in the memory area 20a different from the memory areas for other images or voice data. When no private mode is selected in step S135, on the other hand, the process proceeds to step S137 for recording the data in the ordinary memory area 20b.

When the image pickup mode or the sound recording mode is not set in step S121, it is determined in step S122 whether the reproduction mode is involved or not. When no reproduction mode is set, the process proceeds to step S123, and the reproduction, if under way, is suspended by the reproduction ending process. The reproduction ending process is described in detail later.

In step S124, the mode selecting process is executed based on the input state of the camera operating switch. In addition to the private mode, the modes available include the forcible illumination or prohibition of the flash, the operation of the self-timer, etc., which can be selected arbitrarily by the user according the ongoing scene.

When the reproduction button of the camera operating switches is depressed in steps S121 and S122, the reproduction mode is determined, and the process proceeds to step S125. In step S125, the last image picked up is displayed in priority on the LCD panel 24 on the back of the camera.

In step S126, the state of the lock button of the camera operating switches is determined. Once the lock button is depressed, the images other than the one on display become invisible. In other words, the process proceeds to step S127 and the display time is set to 5 minutes without executing the process of step S128 for determining whether the image is changed or not. This image change determining process is described later.

When no lock operation is performed in step S126, it is determined in step S128 whether the image is changed or not. When no image is changed, the process proceeds to step S130, while when the image is changed, the image on display is switched by the camera operation of the user. In the process, in order to prevent the images designated as private from being easily displayed, the ordinary image data stored in the memory 20b are sequentially displayed on last-in first-out basis. In the next step S130, the image is displayed for only one minute to save energy.

In step S131, the display mode is changed in accordance with the image change operation designated by the user. In this process, the image is enlarged, rotated, or otherwise changed. Then, in step S132, it is determined whether the display time has elapsed or not. When the predetermined display time has elapsed, the process proceeds to step S133 to execute the display ending process thereby terminating this sequence.

As described above, the image lock function makes it possible to circulate the camera among other persons without showing other than the images that the user 70 desires to show in such a situation as shown in FIGS. 15A and 15B. In addition, the display time on the LCD panel is lengthened to five minutes in the lock mode, and therefore an increased number of persons can enjoy the images. When the image is not locked, on the other hand, the time before the display ends is set at one minute thereby to save the energy consumed by image display.

In the case where a detailed review of the image is desired upon expiry of the energy-saving display time in the reproduction mode, the common practice is to depress the reproduction button. Generally, therefore, the reproduction is resumed as specified in steps S146 and S147 in the flowchart of FIG. 17 (described later).

In the lock mode, however, as shown in FIG. 15B, persons other than the user who want to view the image and are often unaccustomed to the camera may be unable to immediately identify the reproduction mode button. In view of this, the camera is devised to resume the display upon depression of any operating button.

Figure 17:
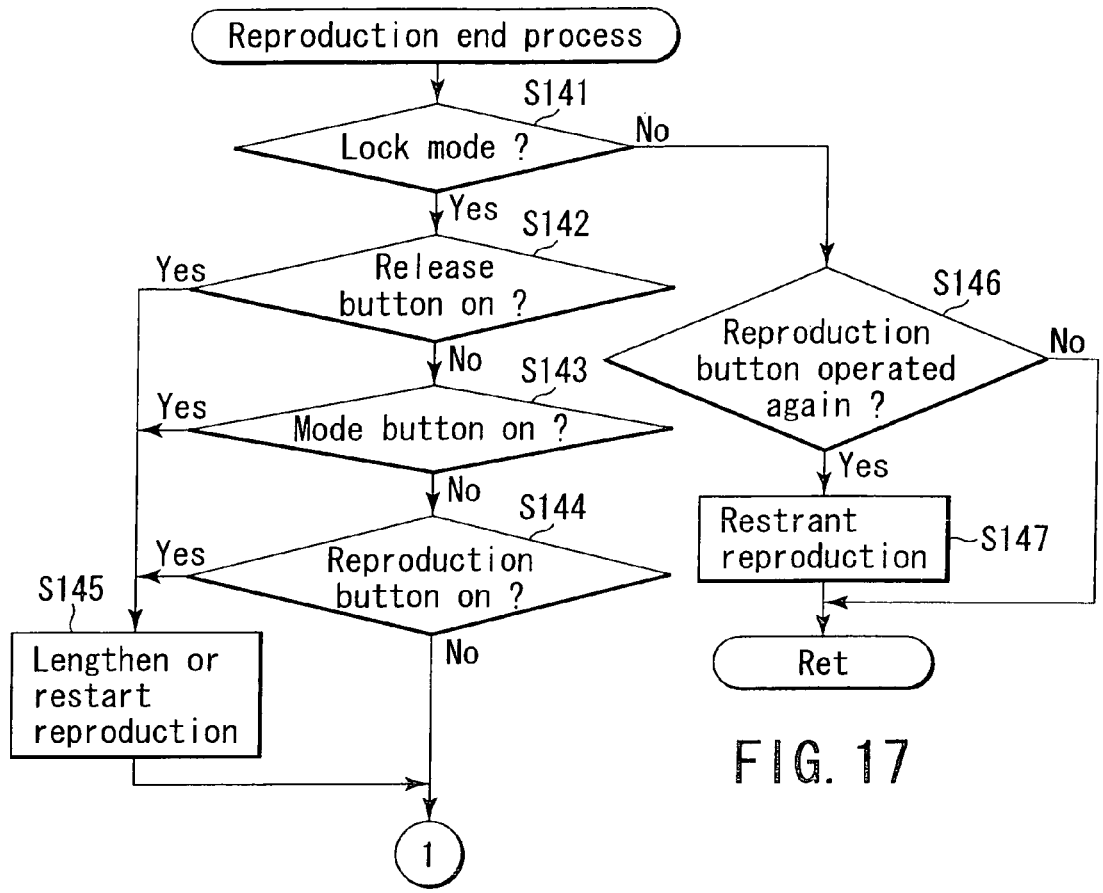
FIG. 17 is a diagram for explaining a subroutine for the detailed operation of the "reproduction ending process" in step S123 of the flowchart of FIG. 16.

FIG. 17 is a diagram for explaining the detailed operation of a subroutine of the "reproduction ending process" in step S123 of the flowchart shown in FIG. 16 described above.

Once this subroutine is started, it is determined first in step S141 whether the lock mode prevails or not. When the lock mode prevails, the process proceeds to steps 142 to S144 for determining whether any one of the release button, the mode button and the reproduction button has been operated or not.

No matter which of the release button, the mode button and the reproduction button is depressed in steps S142 to S144, the process proceeds to step S145 to resume or lengthen the reproducing operation. Thereafter, the process proceeds to step S122 in the flowchart of FIG. 16.

In the case where none of the release button, the mode button and the reproduction button is depressed in steps S142 to S144, on the other hand, step S145 is skipped and the process proceeds to step S122 in the flowchart of FIG. 16. As a result, the release operation becomes impossible, so that no person other than the user can photograph an image and waste the memory capacity.

When it is determined in step S141 that a mode other than the lock mode prevails, the process proceeds to step S146 to determine whether the reproduction button is operated again or not. When only the reproduction button is operated again, the process proceeds to step S147 to restart reproduction and the main subroutine is left. When the reproduction button is not operated again, on the other hand, step S147 is skipped and the main subroutine is left. As a result, the process returns to step S121 in the flowchart of FIG. 16, so that the image pickup operation can be resumed immediately by depressing the release button, and no shutter chance is missed.

This display lock mode is ended by cancellation through the "mode select" process in step S124 of the flowchart shown in FIG. 16.

In changing the display mode in step S131 in the flowchart of FIG. 16, on the other hand, the process shown in FIGS. 18A to 18D is executed.

Figure 18A:
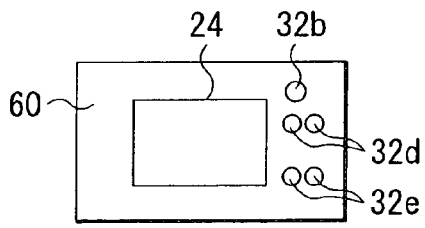
FIGS. 18A to 18D are diagrams for explaining the change in the display mode.
Figure 18B:
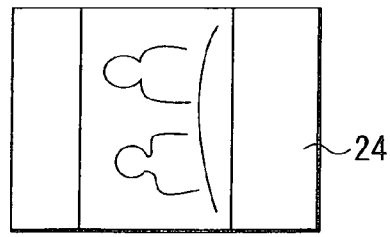
Figure 18C:
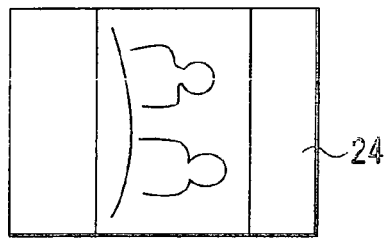

Specifically, as shown in FIG. 18A, a pair of switches 32d and a pair of switches 32e operable while watching the monitor 24 on the back of the camera 60 are arranged also on the back of the camera 60. By operating the switches 32d, as shown in FIGS. 18B and 18C, the image can be displayed at a position rotated counterclockwise or clockwise.

Figure 18D:

Further, by operating the other pair of switches 32e, as shown in FIG. 18D, the display control operation including the enlarged display and the restoration to the original size becomes possible.

This display switching control operation is performed by the CPU 32 through the display control unit 22. This function is applicable to the unlocking operation in a similar manner to the concept of a duplicate key of the safety box.

Figure 19:
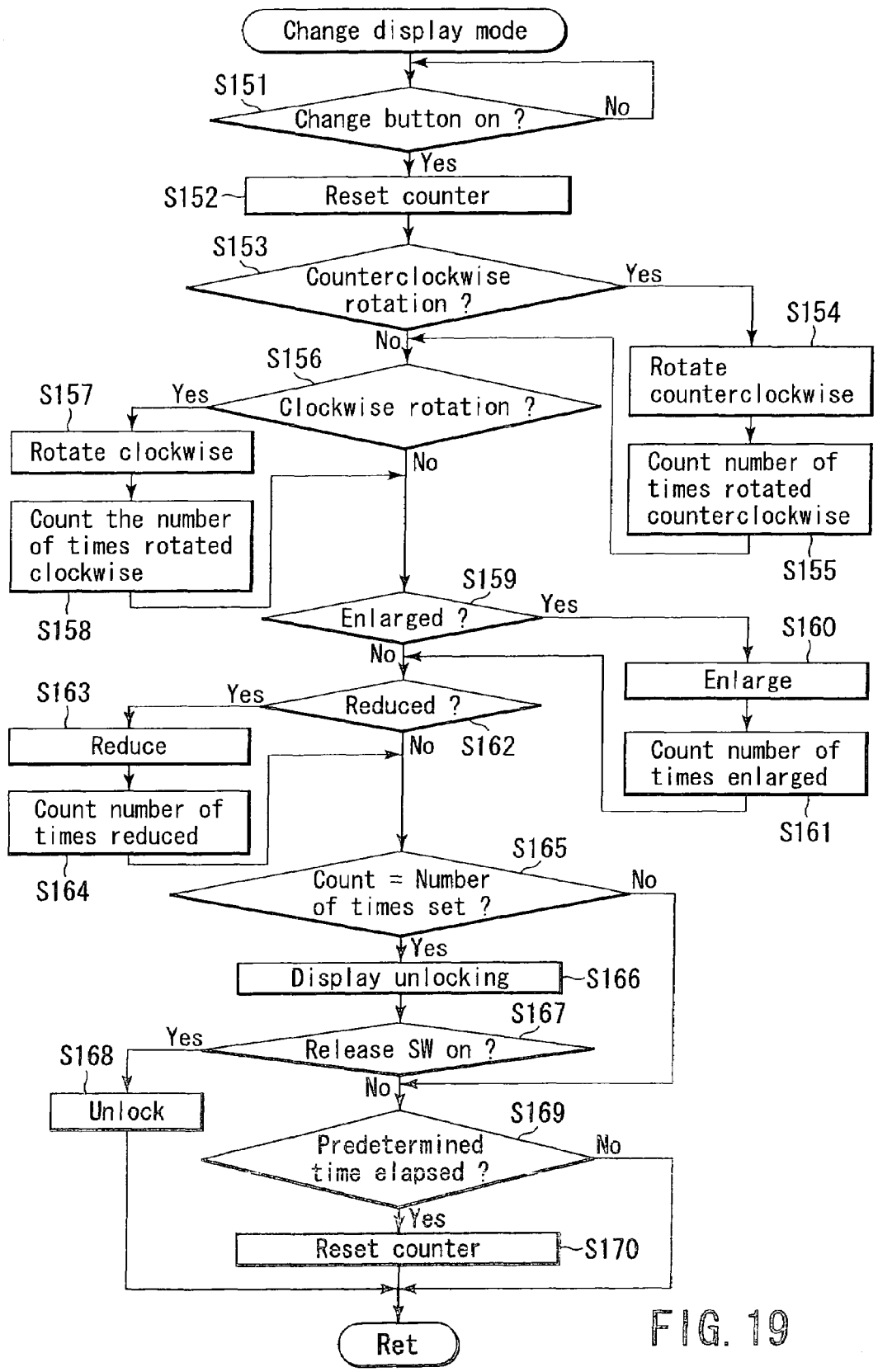
FIG. 19 is a flowchart for explaining the detailed operation of changing the display mode.

FIG. 19 is a flowchart for explaining the detailed operation of changing the display mode.

The description is made below by referring to an image display change button corresponding to the switches 32d, 32e described above.

Once the display mode change routine is started, the first step is to stand by until the change button is turned on in step S151. The tuning on of the change button is followed by step S152 in which the counter is reset.

Then, in step S153, it is determined whether the screen is to be rotated counterclockwise or not. When the screen is to be rotated counterclockwise, the process proceeds to step S154, and the image switching control operation is performed to rotate the screen counterclockwise. In the next step S155, the number of rotations is counted. In similar fashion, it is determined in step S156 whether the screen is to be rotated clockwise or not. When the screen is to be rotated clockwise, the process proceeds to step S157 where the image switching control operation is performed to rotate the screen clockwise, followed by step S158 for counting the number of rotations.

Further, in step S159, it is determined whether the screen is to be enlarged or not. When the screen is to be enlarged, the process proceeds to step S160 for the switching control operation to display the screen in enlarged form. In the next step S161, the number of times the screen is enlarged is counted. In similar fashion, in step S162, it is determined whether the screen is to be reduced or not. When it is determined that the screen is to be reduced, the process proceeds to step S163 for the switching control operation to display the screen in reduced form, followed by step S164 to count the number of times the screen is reduced.

In step S165, it is determined whether the count coincides with the count preset by the user or not. When the count coincides with the preset count, the process proceeds to step S166 to display the unlock operation. When the count fails to coincide with the preset count, on the other hand, the process proceeds to step S169. The count can be reset beforehand in step S152.

When the user agrees to the unlock operation displayed in step S166, the release switch is operated in step S167. In this case, the process proceeds to step S168 where the unlock operation is performed.

In addition to clockwise and counterclockwise rotations described above, the functions of enlarging and reducing the screen may be used at the same time. In this case, the enlarging or reducing operation is determined in steps S159 and S162, and in accordance with this determination, the switching operation is performed in steps S160 and S163, and the number of times this operation is performed is counted in steps S161 and S164.

The time consumed by this series of operation is monitored in step S169, and unless this operation is completed within a predetermined length of time, the process proceeds to step S170 where the counter is reset thereby to invalidate the past operation. Thus, an attempt by an unspecified user other than the camera owner to unlock cannot easily succeed.

The number of times the count is set in step S165 of the flowchart shown in FIG. 19 may be predetermined for each camera and input in a memory. Alternatively, the figure input by the user when setting the mode may be stored in a memory.

Figure 20:
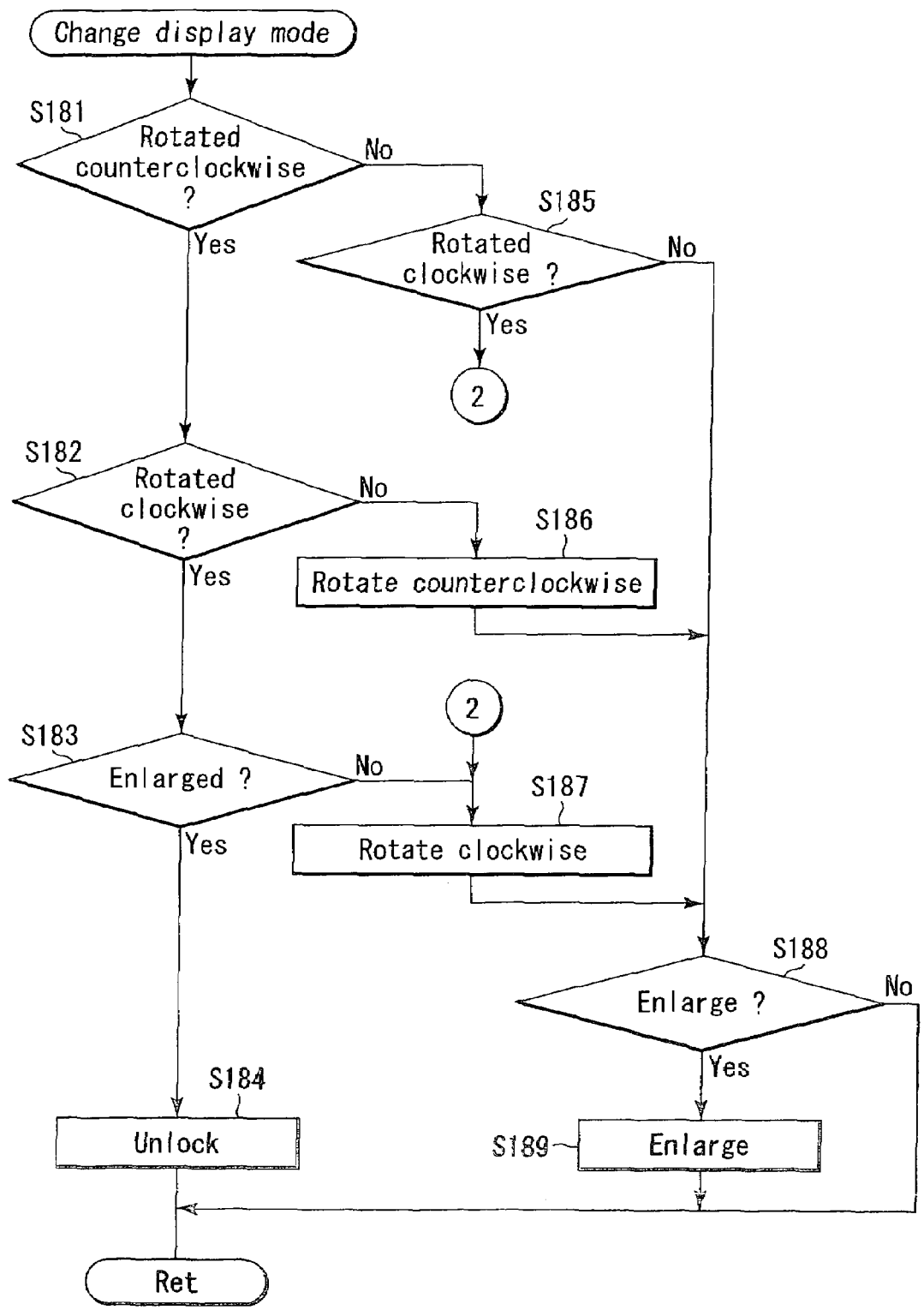
FIG. 20 is a flowchart for explaining the operation of changing the display mode of an electronic camera according to a third embodiment of the invention.

The user, who is afraid that the foregoing operation including the number of rotations required is difficult to memorize and feels bothersome, on the other hand, may employ the method of unlocking by executing the "display mode change" routine shown in the flowchart of FIG. 20 as a third embodiment.

This flowchart represents a case in which predetermined steps of operation are performed in predetermined order for unlocking. As a specific example, the unlocked state is achieved by performing the operation of the counterclockwise rotation, the clockwise rotation and the enlargement in that order within a predetermined length of time.

Specifically, first, it is determined in step S181 whether the screen is to be rotated counterclockwise or not. When the screen is to be rotated counterclockwise, it is determined in the next step S182 whether the screen is to be rotated clockwise or not. When the screen is to be rotated clockwise, it is determined in step S183 whether the screen is to be enlarged or not. When the screen is enlarged, the process proceeds to step S184 to execute the unlock operation.

When the screen is not rotated counterclockwise by the change button in step S181, on the other hand, the process proceeds to step S185 where it is determined whether the screen is to be rotated clockwise or not. When the screen is to be rotated clockwise, the process proceeds to step S187 where the image switching control operation is performed for clockwise rotation, while When the screen is not to be rotated clockwise, the process proceeds to step S188 described later.

In the case where the screen is not rotated clockwise immediately after counterclockwise rotation by the change button in steps S181 and S182, the process proceeds to step S186 for screen switching control operation to assure counterclockwise rotation of the screen. Thereafter, the process proceeds to step S188.

Further, in the case where the enlarge operation is not performed immediately after the clockwise rotation by the change button in steps S181 to S183, the process proceeds to step S187 for the screen switching control operation to assure clockwise rotation.

In step S188, it is determined whether the image is to be displayed in enlarged form or not. When the image is not displayed in enlarged form, the main routine is left, while when the image is to be displayed in enlarged form, on the other hand, the process proceeds to step S189 to perform the screen switching control operation to display the image in enlarged form.

As described above, the image display in enlarged form (step S189) is not carried out immediately after the counterclockwise rotation in step S181 or clockwise rotation in step 182, but made possible only after counterclockwise rotation in step S186 or clockwise rotation in step S187 or in the case where the image is rotated in neither clockwise nor counterclockwise (steps S181 and S185).

As described above, according to the third embodiment, the unlock operation can be performed by effectively using the image mode changeover switch of an ordinary digital camera. As a result, the provision of a useless switch is eliminated and the camera designed in a way to permit no person other than the user to easily view other than specified images.

Also, an application of this unlocking function can lead to the control technique to allow reproduction of private information.

Specifically, the result of the private image pickup operation or private voice recording operation performed after the determination "YES" in step S135 in the flowchart of FIG. 16 is recorded in the memory 20a from which the data cannot be easily reproduced. By setting the camera specification in a way to permit the contents of the data thus recorded to be viewed or heard only by the user, the fear of the private information being exposed to another person 74 is obviated in the situation shown in FIGS. 15A and 15B.

Next, a fourth embodiment of the invention is explained.

The fourth embodiment concerns a method of permitting the reproduction of private information or the unlocking method according to the aforementioned embodiment is explained with reference to FIGS. 21A, 21B and 22.

FIG. 21A shows the manner in which the camera 60 is accommodated in a case 80 for carrying the camera 60. A strap 82 is attached to the body of the camera 60.

A specific pattern 84 is drawn on the reverse side of the camera case 80 as shown in FIG. 21B. When this pattern 84 is varied from one camera case to another (or, from one camera to another accommodated in the case), the camera can be designed in such a manner that the CPU 32 of the camera determines that the user is trying to unlock and thus controls the unlock operation by photographing an image of the pattern with the imaging lens 12 of the camera 60.

Specifically, in the "display mode change" process in step S131 in the flowchart of FIG. 16, the program of the routine shown in FIG. 22 is executed, and the pattern of a specific case can be used as a signal like a password for the unlock operation.

In other words, assume that the camera is set to the unlock mode by the camera switching operation before entering the main routine. In step S191, it is determined whether the camera is in the unlock mode or not. When the camera is not in unlock mode, the process proceeds to step S198 for executing the process to make possible the display mode change such as the rotation or the size change.

When the camera is in unlock mode, on the other hand, the process proceeds to step S192 for determining the state of the release switch. As shown in FIG. 21B, the camera 60 is set in position directed toward the pattern 84 formed on the reverse side of the case 80 and the release button 32a is depressed, followed by proceeding to step S193. When the release button 32a is not depressed, the process proceeds to step S191.

In steps S193 and S194, the information including the focal length f of the imaging lens 12 of the camera and the object distance L are input by a well-known zoom encoder or length measuring means at the timing when the release button 32a is depressed. Then, in step S195, the image signal obtained by the image pickup device 14 is determined.

In step S196, it is determined whether the specific pattern 84 is formed on the reverse side of the camera case 80. When it is determined that the specific pattern is an unlocking pattern, the process proceeds to step S197 for unlocking. When the specific pattern is not an unlocking pattern, however, the main routine is left without unlocking.

Figure 23A:
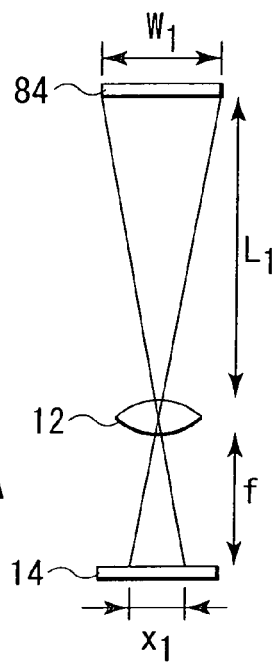
FIGS. 23A and 23B are diagrams for explaining the operation of determining a zoom position and a distance according to the fourth embodiment of the invention.
Figure 23B:
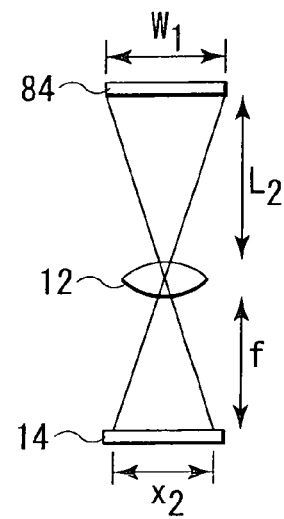

As described above, the zoom position and the distance are determined in steps S193 and S194 by reason of the fact that as shown in FIGS. 23A and 23B, the ratio which the pattern represents of the imaging device 14 assumes different values $x_1$ and $x_2$ for different distances $L_1$ and $L_2$, respectively, from the camera (imaging lens 12) to the pattern 85 of the case.

Specifically, as shown in FIG. 21B, the information described above are utilized to suppress the distance variations with the camera set in position and determine the degree of coincidence of the pattern correctly. The pattern 84 of the camera case is recorded in the internal memory of the camera beforehand. This may be either written in the factory of the camera maker or by the user after shipment.

As described above, according to the fourth embodiment, a camera is provided in which the unlock operation or the operation of reproducing private information can be performed without any bothersome operation simply by setting the camera in position directed toward the case and depressing the release button, thereby protecting the privacy of the user, while at the same time permitting the user to enjoy the camera safely in both private situations and public places.

Next, a fifth embodiment of the invention is explained.

Figure 24A:
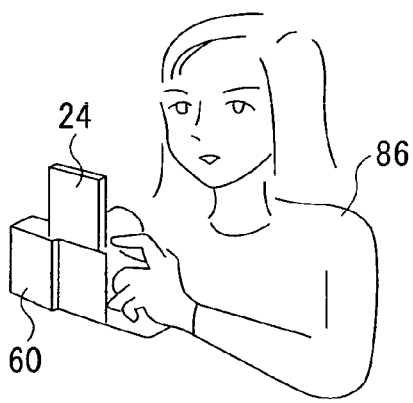
FIGS. 24A to 24C are diagrams for explaining an electronic camera according to a fifth embodiment of the invention.
Figure 24B:
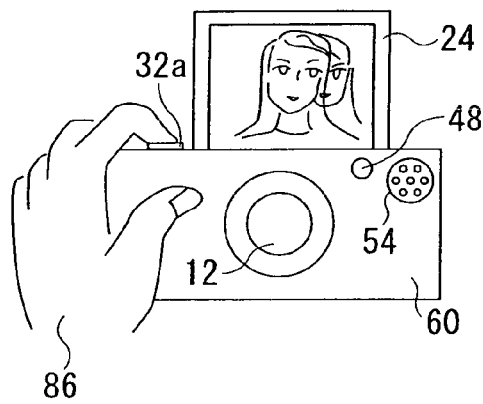
Figure 24C:
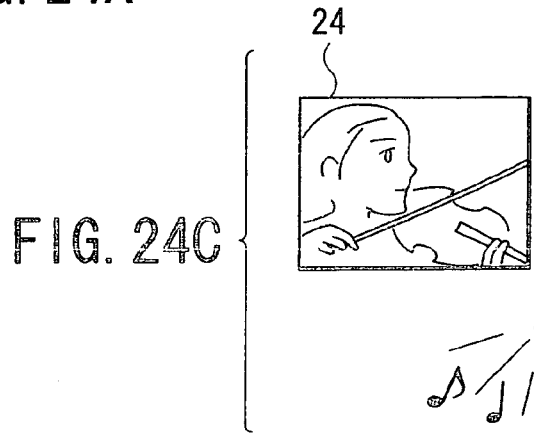

FIGS. 24A to 24C show a camera according to this embodiment, in which the reproduction of private information is determined by a pattern of a user's face instead of the specific pattern determined in advance.

In the camera 60 according to the fifth embodiment, the LCD panel 24 on the back of the camera can be folded and directed forward as shown in FIGS. 24A and 24B. Therefore, a user 86 watching the imaging lens 12 of the camera, can observe the monitor at the same time. As a result, the image of her face input in advance is displayed on the monitor, while at the same time displaying by synthesis of the image currently being picked up by the imaging lens 12. When the two images coincide with each other, as shown in FIG. 24C, the private reproduction is authenticated.

Specifically, as shown in FIG. 24A, when the user 86 sets the camera 60 in position with the imaging lens 12 directed toward herself and depresses the release button 30a, a private image is displayed on the LCD panel 24 as a monitor as shown in FIG. 24C and a private voice is reproduced by the speaker 54 only when the authentication is granted as described above.

Figure 25:
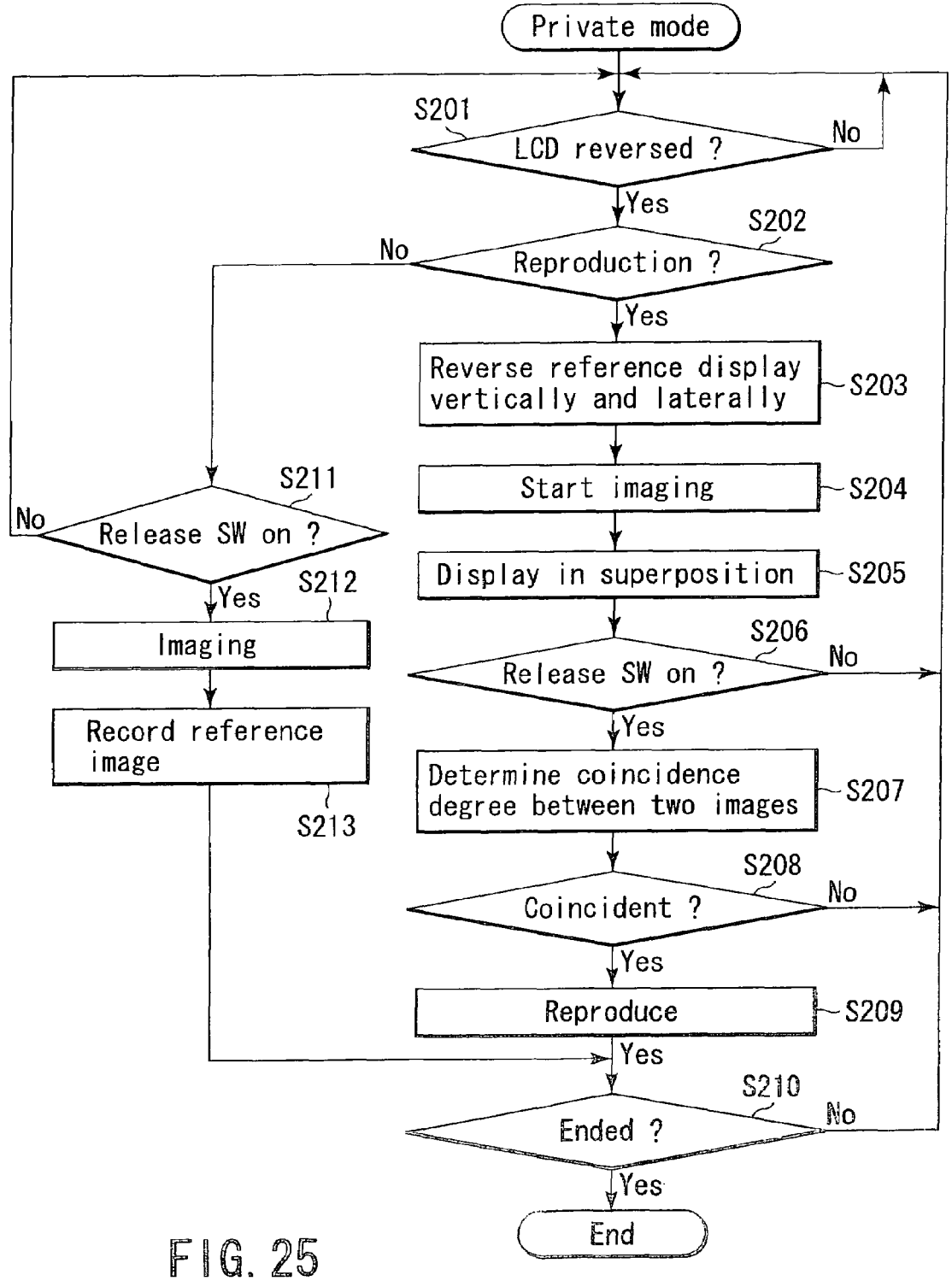
FIG. 25 is a flowchart for explaining the control operation of an electronic camera according to the fifth embodiment of the invention.

FIG. 25 is a flowchart for explaining the operation of controlling this camera. Once the private mode is set by the mode setting function, the process of the flowchart shown in FIG. 25 is executed.

Upon execution of the private mode, it is first determined in step S201 whether the display unit of the LCD panel 24 has been reversed or not. Only when the LCD panel 24 is folded, as shown in FIGS. 24A and 24B, the process proceeds to step S202 to record an image for authenticating the private image reproduction or to reproduce an authenticated private image.

In step S202, it is determined whether the reproduction mode is involved or not. When it is determined that the reproduction mode is involved, the process proceeds to step S203, where a reference image is displayed by being reversed laterally and vertically on the monitor (LCD panel). The monitor is thus reversed vertically and used like a mirror to set the user's face in position at the time of imaging for authentication.

Then, in step S204, the imaging operation is started by the imaging device 14 and the imaging lens 12. Further, the superposed display is carried out in step S205. In the LCD panel 24 shown in FIG. 24B, the image portion not completely superposed is displayed.

In step S206, it is determined whether the release operation has been performed or not by the user when the images are superposed. In the case where the release operation has been so performed, the process proceeds to step S207. Otherwise, the process proceeds to step S201.

In step S207, the degree of coincidence between the recorded image and the image currently being picked up is determined by the CPU 32 of the camera. When it is determined in step S208 that the images are not coincident with each other, the process proceeds to step S201, while only when it is determined that the images are coincident with each other, the process proceeds to step S209 to reproduce the private image. Under this condition, the unlock operation described above may be performed.

The reproduced signal is displayed until the ending operation is performed by the user according to the determination in step S210. When the process is not ended in step S210, the process proceeds to step S201.

When it is determined in step S202 that the reproduction mode is not involved, the mode is set to photograph an image providing a reference for authentication. In other words, the process proceeds to step S211 to determine the release operation. When it is determined that the release operation has been performed, the process proceeds to step S212 for the imaging operation. In the next step S213, the reference image is recorded followed by proceeding to step S210.

When the release operation is not performed in step S211, on the other hand, the process proceeds to step S201.

As explained above, according to the fifth embodiment, the user's face is determined by the camera to permit the reproduction of the private data or unlock the locked screen. Thus, the user can observe a special photo or enjoy the music simply by superposing his present face on his past face for authentication displayed on the monitor. As a result, a product is provided emphasizing the privacy protection with the reproduction function which cannot reproduce specified data by the operation of other persons.

In this way, privacy is protected and many persons can enjoy the device.

According to this fifth embodiment, authentication is granted using an image as an example. Nevertheless, authentication and privacy protection using a voice are also possible.

A sixth embodiment concerns the authentication and the privacy protection by voice.

FIG. 26A is a diagram showing an example of authentication by voice input, and FIG. 26B is a diagram showing an example in which the image reproduced by this authentication is viewed.

As shown in FIG. 26A, specified words are input by the user into the microphone 48 (FIG. 2) of the camera 60. When the voice thus input is coincident with the voice input beforehand, as shown in FIG. 26B, it is displayed on the LCD panel 24 of the camera 60. As a result, the user 86 can enjoy the private image. Also, the private voice may be reproduced.

The operation in the private mode controlled by the CPU built in the camera is explained with reference to the flowchart of FIG. 27.

First, in step S221, the voice input start is determined. Only when the voice input is so started, the process proceeds to step S222 to determine whether the reference signal has been input or not. In the case where the reference signal has been input, the process proceeds to step S223. Otherwise, the process proceeds to step S226.

In step S223, the voice signal begins to be recorded. Then, a reference signal is formed in step S224, and recorded in the memory in step S225.

In step S226, on the other hand, the input voice is not a reference signal and therefore the recording is started. In step S227, the input voice signal is compared with the reference signal, and further it is determined in step S228 whether comparison shows whether similarity exists between the two signals.

Specifically, the reference voice signal input in advance is compared with the next input voice signal, and it is determined in step S228 whether the two signals are similar to each other. Only when the two signals are similar, the process proceeds to step S229 where the operation of controlling a specific image and a specific voice becomes possible for reproduction.

As described above, according to the sixth embodiment, only when the same words and a password sound are input with a specific voice, the private image or voice can be reproduced. Thus, a camera with privacy protected is provided in which a special image is prevented from being viewed by a third party or an important voice signal cannot be easily reproduced.

With this privacy protection, images and voices other than private one can be enjoyed safely by many persons. This design makes it possible to promote the camera technique both to increase the reproduction screen size and to improve the sound quality of the reproduced voice of the camera. Also, the user can make determination based on the logical product (AND operation) of the voice and the image.

As explained above, according to the embodiments described above, an information input reproduction device is provided which can be circulated to permit the recorded information to be enjoyed by many persons. In this way, the reproduction of other images and voices than private information is prohibited by other than the camera owner who can enjoy the private images and private voices easily.

This invention is of course applicable to the portable telephone with camera, the personal computer and the like.

It will be thus understood from the foregoing description that according to this invention, there is provided an electronic camera in which, when the camera is circulated among unspecified many persons to promote human communication and information exchange, images other than those designated are prevented from being displayed on the camera display unit utilizing the reproduction function, thereby preventing the complication of information while at the same time protecting private information.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic camera comprising:
a calendar unit which generates date information;
an information generating unit which generates private information when the date information output by the calendar unit is detected to be in a predetermined time zone;
an image pickup unit which generates image data from an output of an image pickup device and records it on a recording unit;
a reproduction unit which displays the image data by reading it out from the recording unit;
an image processing unit which performs a predetermined process treatment on the image data; and
a control unit which, when the information generating unit generates private information, adds the private information to the image data generated by the image pickup unit, and in the case where the private information is added to the image data read out from the recording unit by the reproduction unit, has the reproduction unit display the image data processed by the image processing unit.

2. The electronic camera according to claim 1, wherein the processing unit replaces the image data by textual information.

3. The electronic camera according to claim 1, wherein the processing unit changes resolution of an image, so that the image of image data is unidentifiable.

4. A control method of an electronic camera comprising:
a process of obtaining date information from a calendar unit, and generating private information when the date information is detected to be in a predetermined time zone;
a process of obtaining image data by controlling an image pickup unit and recording the obtained image data on a recording unit, wherein, when private information is generated in the private information generating process, said private information is recorded on the recording unit along with the image data; and
a process of reading out image data from the recording unit and displaying it on a display unit, wherein, when private information is added to the read out image data, the image data is subject to a predetermined process treatment and is displayed on the display unit.

5. The control method of an electronic camera according to claim 4, wherein the predetermined process treatment replaces image data by textual information.

6. The control method of an electronic camera according to claim 4, wherein the predetermined process treatment changes resolution of image so that image data is unidentifiable.

* * * * *